US010072689B2

United States Patent
Parker et al.

(10) Patent No.: US 10,072,689 B2
(45) Date of Patent: Sep. 11, 2018

(54) STANCHION SYSTEMS, STANCHION ATTACHMENT SYSTEMS, AND HORIZONTAL LIFELINE SYSTEMS INCLUDING STANCHION SYSTEMS

(75) Inventors: Thomas W. Parker, Jamestown, PA (US); David A. Winslow, Hermitage, PA (US); Eric M. Manson, Franklin, PA (US)

(73) Assignee: Honeywell International, Inc., Morristown, NJ (US)

( * ) Notice: Subject to any disclaimer, the term of this patent is extended or adjusted under 35 U.S.C. 154(b) by 1075 days.

(21) Appl. No.: 12/366,649

(22) Filed: Feb. 6, 2009

(65) Prior Publication Data

US 2009/0196679 A1 Aug. 6, 2009

Related U.S. Application Data

(60) Provisional application No. 61/026,609, filed on Feb. 6, 2008, provisional application No. 61/026,573, filed on Feb. 6, 2008.

(51) Int. Cl.
*F16B 9/02* (2006.01)
*E04G 21/32* (2006.01)
*E04G 5/04* (2006.01)

(52) U.S. Cl.
CPC .............. *F16B 9/023* (2013.01); *E04G 5/045* (2013.01); *E04G 21/3219* (2013.01);
(Continued)

(58) Field of Classification Search
CPC ....................................................... F16B 39/10
(Continued)

(56) References Cited

U.S. PATENT DOCUMENTS

D28,212 S * 1/1898 biedenfeld ..................... 411/427
906,476 A * 12/1908 ullmann .................. F16B 39/08
411/197
(Continued)

OTHER PUBLICATIONS

Slide. (n.d.) American Heritage® Dictionary of the English Language, Fifth Edition. (2011). Retrieved Nov. 23, 2016 fromhttp://www.thefreedictionary.com/slide.*
(Continued)

*Primary Examiner* — Katherine W Mitchell
*Assistant Examiner* — Candace L Bradford
(74) *Attorney, Agent, or Firm* — Wood, Phillips, Katz, Clark & Mortimer

(57) ABSTRACT

A stanchion system, includes a stanchion post and an attachment system for attachment to a flange which includes a first edge and a second edge. The attachment system includes a crossbar including an extending section and an abutment member on a first end thereof to abut the first edge of the flange; a base including a passage through which the extending section of the crossbar is movable and a seating for the stanchion post; and a connector including a first section and a second section. The second section of the connector is attachable to the extending section of the crossbar at one of a plurality of incremental positions. The first section of the connector is movable relative to the second section to adjust the position of the first section relative to the abutment member of the crossbar. In several embodiments, the first section is movable relative to the second section to abut the base on a side of the base opposite the side upon which the flange is positioned to adjust the position of the first section relative to the abutment member.

10 Claims, 15 Drawing Sheets

(52) U.S. Cl.
CPC ......... *E04G 21/3233* (2013.01); *Y10T 403/18* (2015.01); *Y10T 403/39* (2015.01); *Y10T 403/69* (2015.01)

(58) Field of Classification Search
USPC ...... 182/113, 3; 248/72, 538, 228.3, 229.22; 411/321
See application file for complete search history.

(56) References Cited

U.S. PATENT DOCUMENTS

| | | | | |
|---|---|---|---|---|
| 1,021,559 A * | 3/1912 | steele | F16B 39/10 | 411/191 |
| 1,029,775 A * | 6/1912 | tobin | F16B 39/10 | 411/191 |
| 1,155,408 A * | 10/1915 | edson | F16B 39/10 | 411/204 |
| 2,084,985 A * | 6/1937 | bill | F16B 39/08 | 411/197 |
| 3,004,776 A * | 10/1961 | Sebardt | F16L 15/008 | 285/212 |
| 3,106,413 A * | 10/1963 | Hamlin | F16L 15/008 | 285/212 |
| 3,217,833 A * | 11/1965 | Smith | E04G 21/3261 | 182/3 |
| 3,373,243 A * | 3/1968 | Janowiak | H01R 9/0521 | 174/88 C |
| 3,448,430 A * | 6/1969 | Kelly | H01R 9/05 | 174/75 C |
| 3,866,650 A * | 2/1975 | Larkin | B64C 27/54 | 411/133 |
| 4,481,748 A * | 11/1984 | D'Alessio | E04G 11/48 | 182/178.5 |
| 4,715,756 A * | 12/1987 | Danico | F16B 33/00 | 411/369 |
| 4,812,157 A * | 3/1989 | Smith | C03B 23/0252 | 65/273 |
| RE33,154 E * | 1/1990 | Hahn | B65G 69/003 | 414/396 |
| D311,131 S * | 10/1990 | Saito | D8/397 | |
| 5,029,670 A | 7/1991 | Whitmer | | |
| 5,240,361 A * | 8/1993 | Armstrong | F16B 19/109 | 269/48.2 |
| 5,307,897 A * | 5/1994 | Turner | A62B 35/04 | 182/3 |
| 5,320,264 A * | 6/1994 | Weir | B60R 9/048 | 224/321 |
| 5,353,891 A * | 10/1994 | Griek | E04G 21/3233 | 182/45 |
| 5,409,195 A | 4/1995 | Strickland | | |
| 5,584,410 A * | 12/1996 | Siblik | B65D 45/32 | 220/320 |
| 5,711,397 A * | 1/1998 | Flora | A62B 35/0062 | 182/3 |
| 5,788,400 A * | 8/1998 | Wey | F16B 7/0413 | 24/589.1 |
| 6,036,146 A * | 3/2000 | Paterson | A62B 35/0056 | 182/113 |
| 6,173,809 B1 | 1/2001 | Cole | | |
| 6,338,399 B1 * | 1/2002 | Choate | A62B 35/0056 | 188/374 |
| 6,412,598 B1 * | 7/2002 | Mackinnon | E04G 21/3261 | 182/113 |
| 6,439,344 B1 * | 8/2002 | Cole | A62B 35/0068 | 182/113 |
| 6,478,111 B2 | 11/2002 | Olson | | |
| 6,502,663 B2 | 1/2003 | Ecker | | |
| 6,551,041 B2 | 4/2003 | Choate | | |
| 6,581,725 B2 | 6/2003 | Choate | | |
| 6,595,713 B1 * | 7/2003 | Wilson | B63H 16/04 | 16/405 |
| 6,688,062 B2 | 2/2004 | Choate | | |
| 6,688,427 B2 | 2/2004 | Cole | | |
| 6,722,470 B2 * | 4/2004 | Carson | A62B 35/0056 | 182/113 |
| 6,763,910 B2 | 7/2004 | Cole | | |
| 6,779,629 B2 | 8/2004 | Ecker | | |
| 6,779,630 B2 | 8/2004 | Choate | | |
| 6,898,905 B1 * | 5/2005 | Kirschner | F16B 2/065 | 248/228.5 |
| 7,153,161 B2 * | 12/2006 | Huang | H01R 9/0524 | 439/583 |
| 7,740,502 B2 * | 6/2010 | Blew | H01R 9/0521 | 439/578 |
| 8,002,579 B2 * | 8/2011 | Alrutz | H01R 9/0521 | 439/578 |
| 8,171,629 B2 * | 5/2012 | Blew | H01R 9/0521 | 29/402.01 |
| 8,579,659 B2 * | 11/2013 | Tran | H01R 13/635 | 439/578 |
| 2001/0032435 A1 | 10/2001 | Austin | | |
| 2002/0013088 A1 * | 1/2002 | Rodrigues | H01R 9/0521 | 439/578 |
| 2002/0040559 A1 * | 4/2002 | Choate | E04G 21/3261 | 52/414 |
| 2002/0046506 A1 * | 4/2002 | Ullman | E04D 13/12 | 52/1 |
| 2005/0136735 A1 * | 6/2005 | Rodrigues | H01R 9/0524 | 439/578 |
| 2006/0272891 A1 * | 12/2006 | Casebolt | A62B 1/04 | 182/36 |
| 2006/0273600 A1 | 12/2006 | Rohlf | | |
| 2008/0277549 A1 * | 11/2008 | Curtin | A62B 1/04 | 248/228.3 |
| 2013/0243545 A1 * | 9/2013 | Oh | F16B 2/065 | 411/321 |
| 2015/0135510 A1 * | 5/2015 | Agarwal | F16B 39/32 | 29/456 |

OTHER PUBLICATIONS

Shadow Beam Anchor brochure, Miller Fall Protection Products, 1999, USA.

* cited by examiner

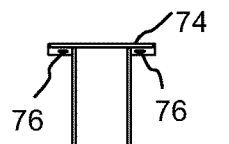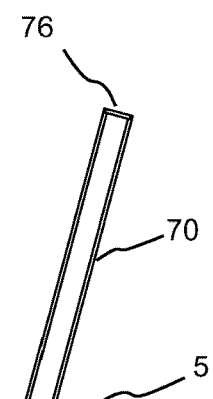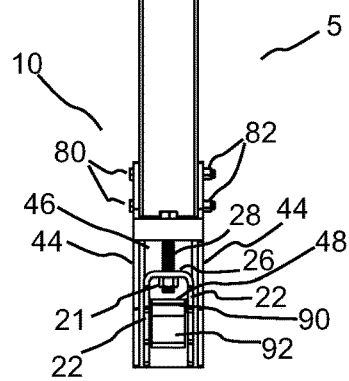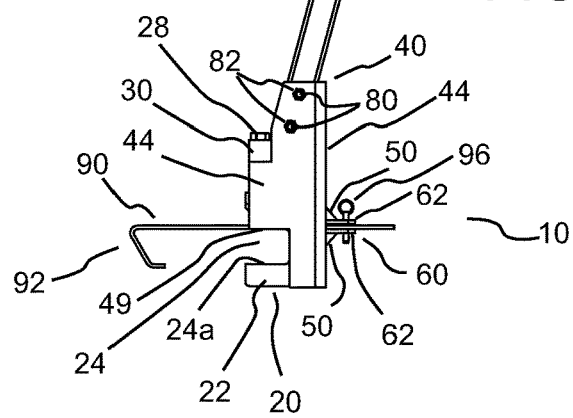

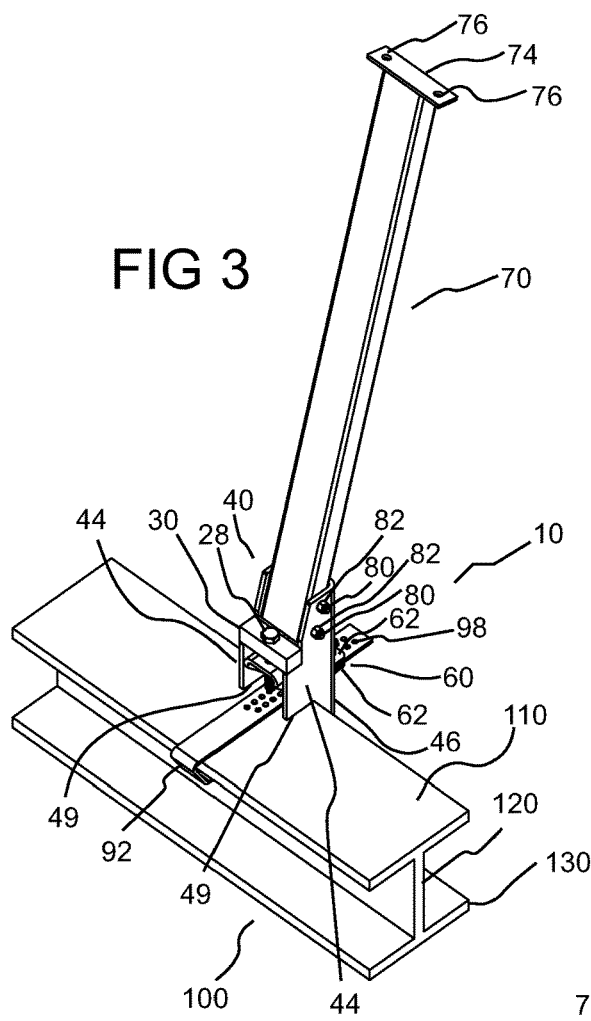

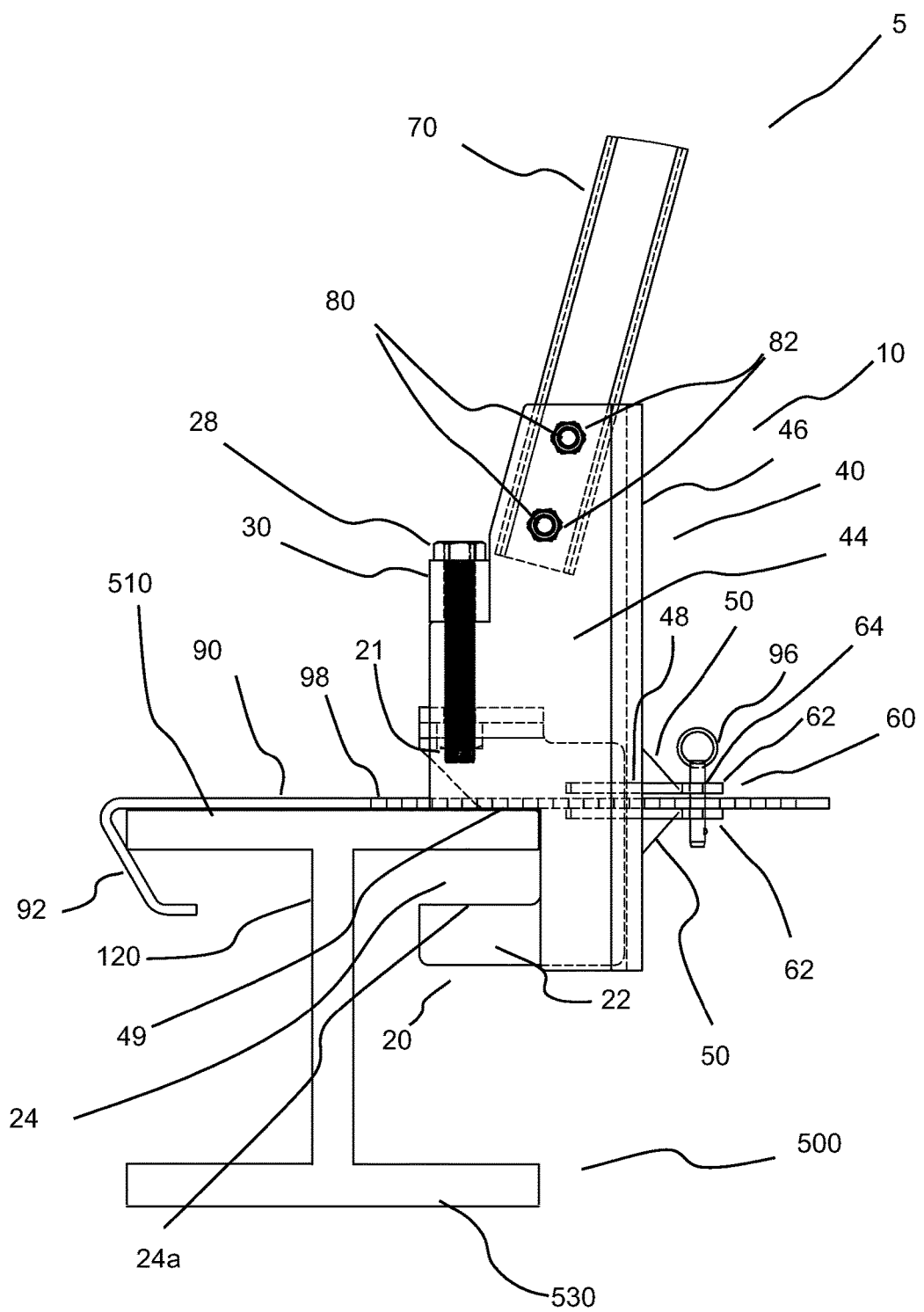

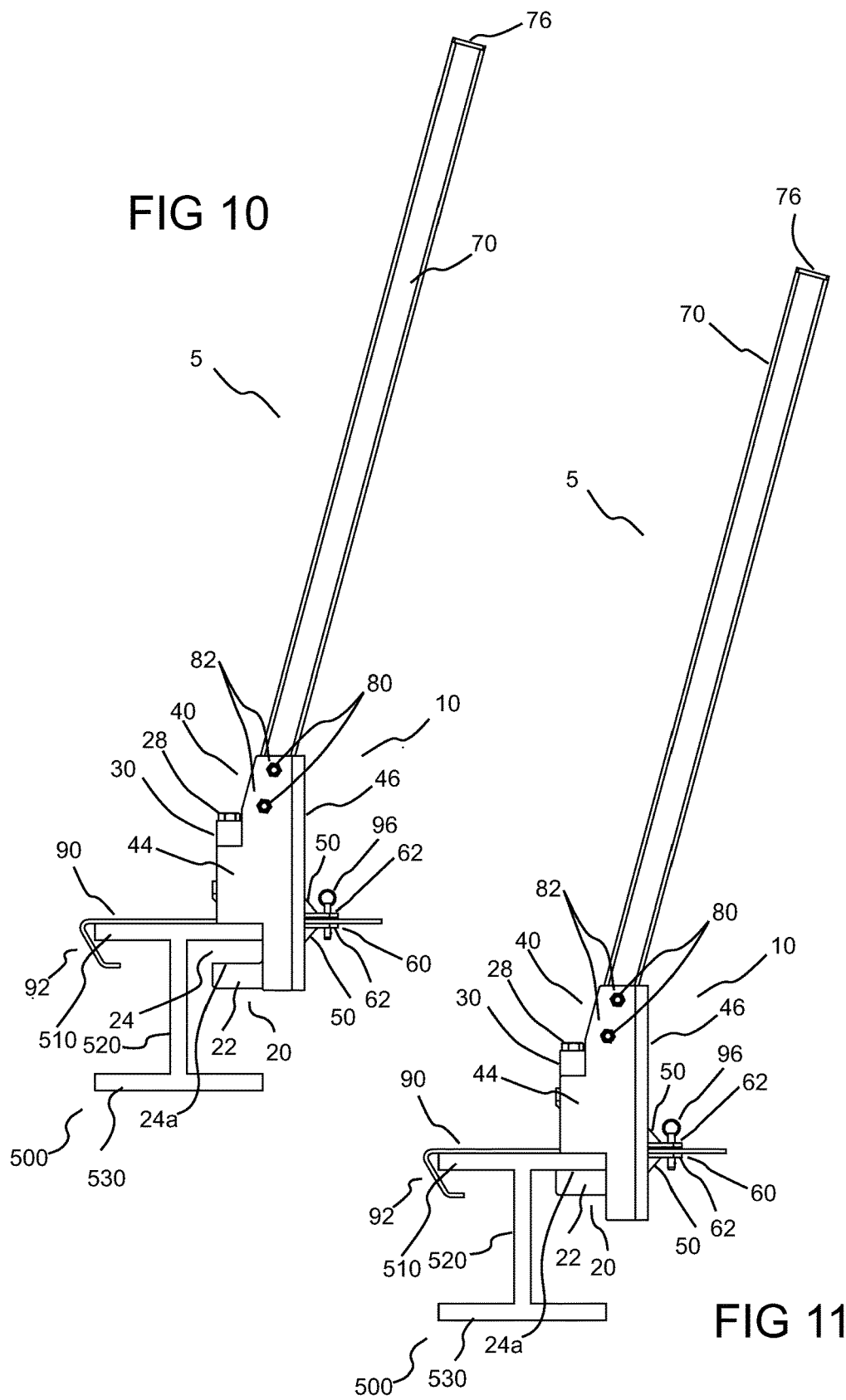

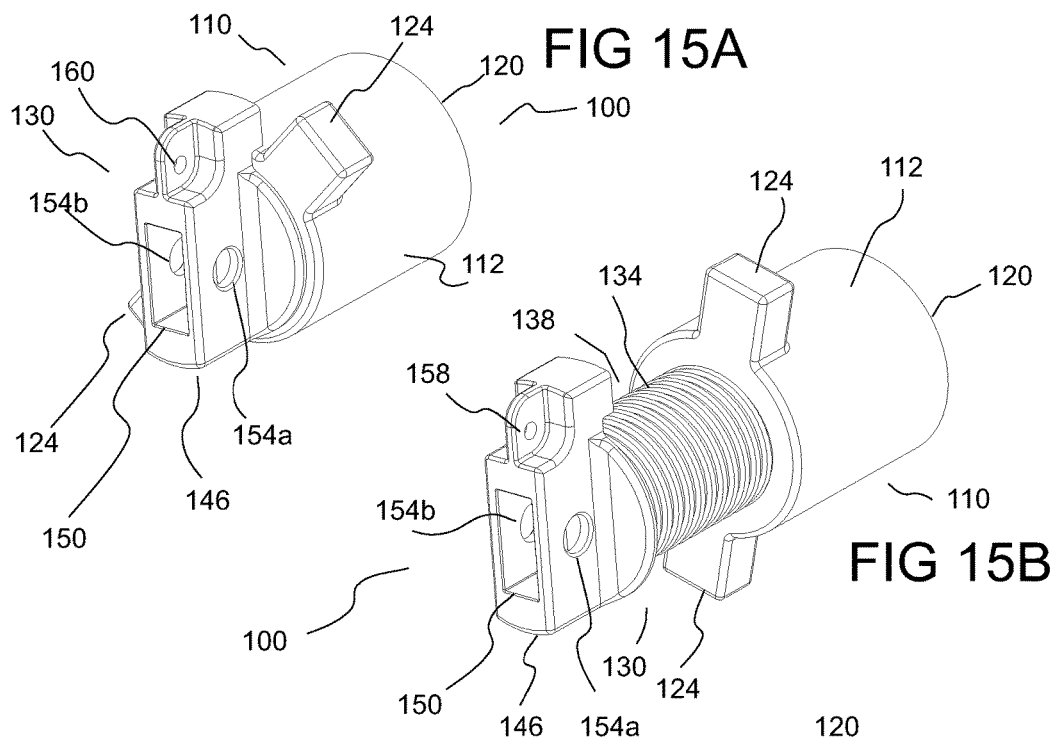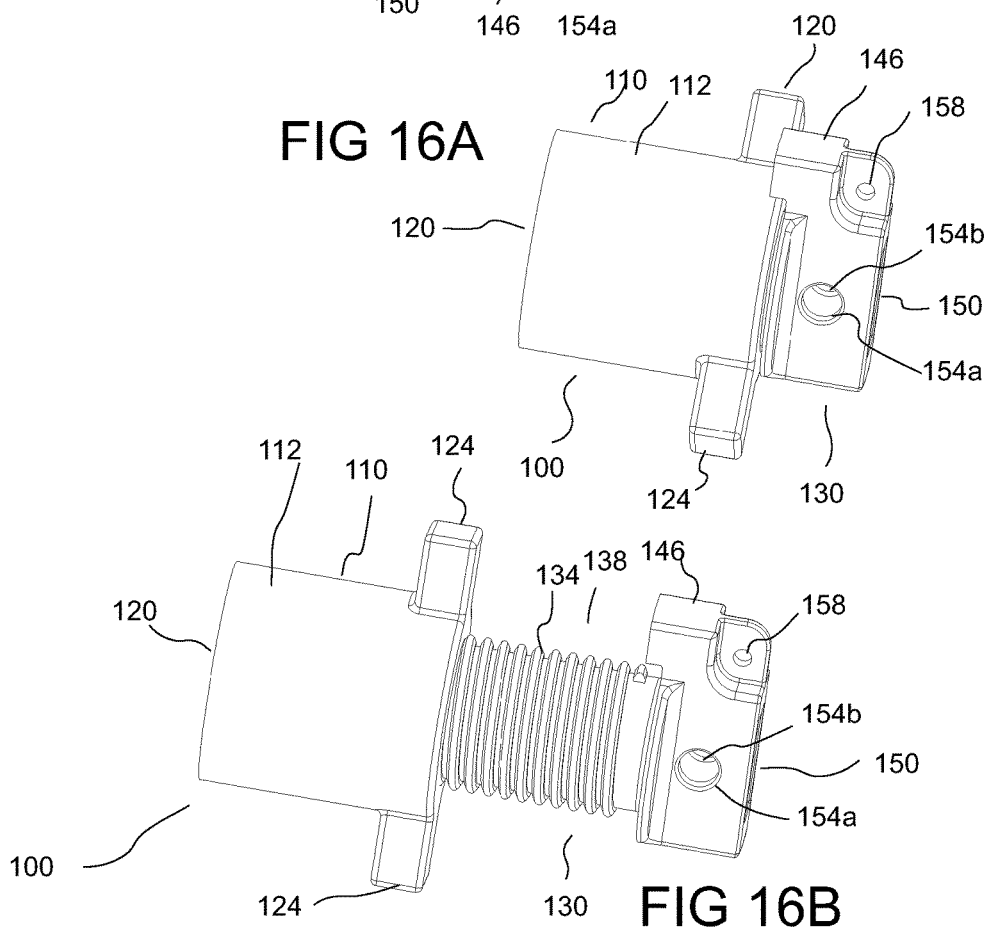

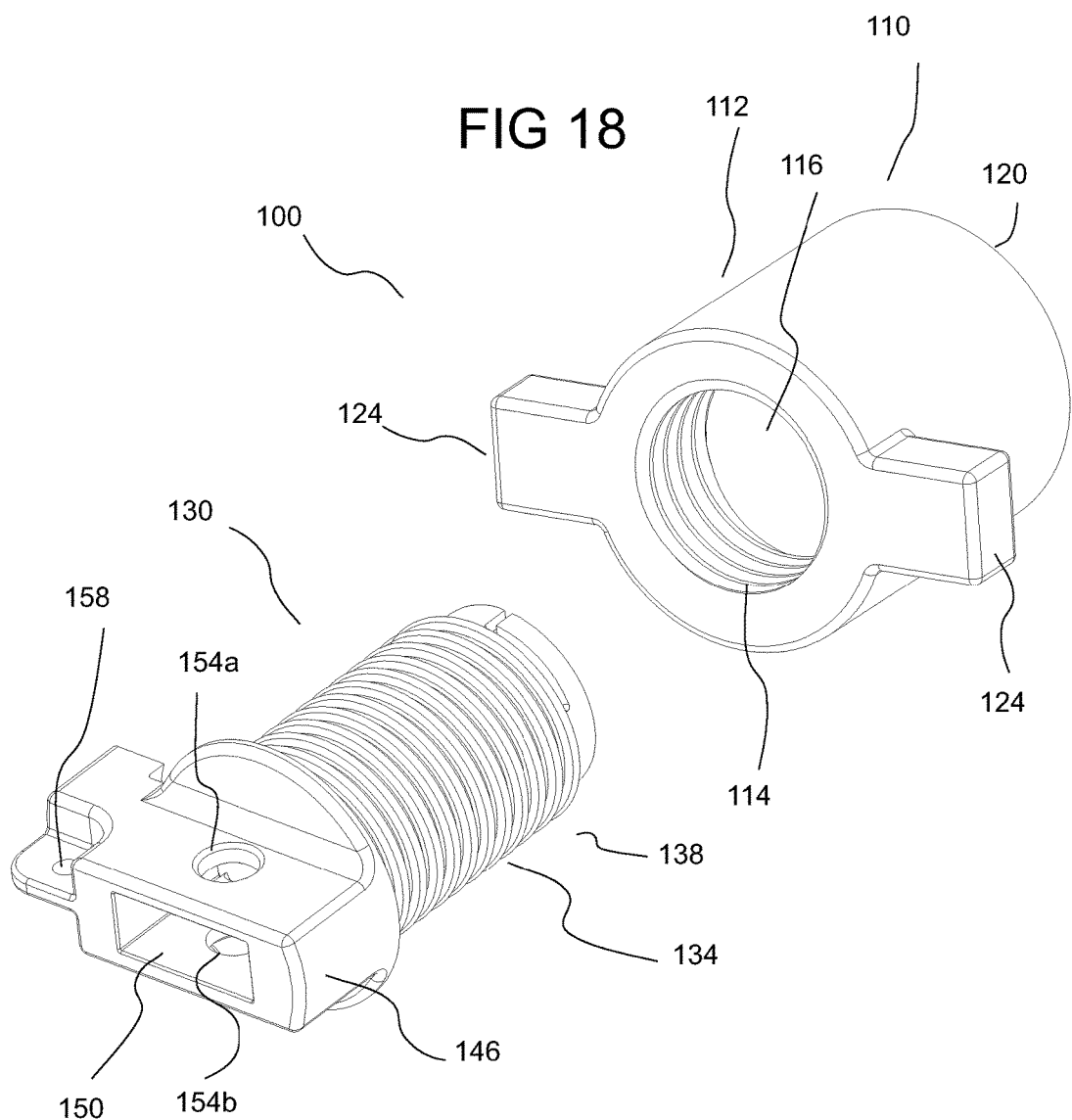

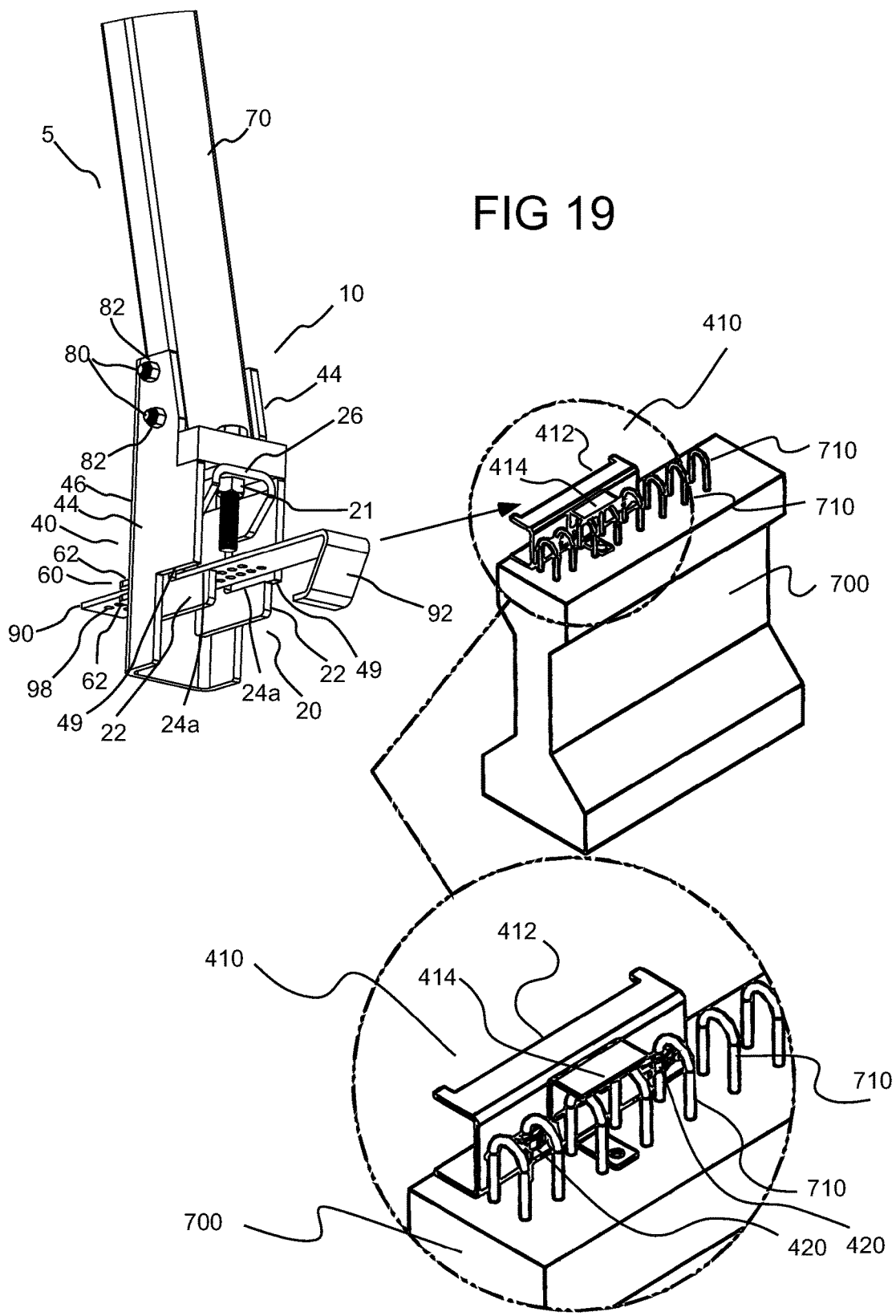

STANCHION SYSTEMS, STANCHION ATTACHMENT SYSTEMS, AND HORIZONTAL LIFELINE SYSTEMS INCLUDING STANCHION SYSTEMS

CROSS-REFERENCE TO RELATED APPLICATIONS

This application claims benefit of U.S. Provisional Patent Application Ser. No. 61/026,573 filed Feb. 6, 2008 and U.S. Provisional Patent Application Ser. No. 61/026,609 filed Feb. 6, 2008, the disclosures of which are incorporated herein by reference.

BACKGROUND OF THE INVENTION

The present invention relates to stanchion systems, stanchion attachment systems (for attaching stanchions or stanchion posts to a support), and horizontal lifelines including stanchion systems.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

Fall protection systems including safety harnesses and lanyards are commonly used as parts of fall protection systems for persons subjected to the potential of a fall from a height. Typically, a lifeline or lanyard is connected to an overhead anchorage. However, in some cases (for example, steel building erection, bridge work, pipe rack erection and maintenance, leading edge work, etc.) suitable overhead fall protection anchorage may not exist.

In cases in which no suitable overhead anchorage is available, one can create an anchorage or anchorage system for fall protection. For example, temporary horizontal lifeline systems (available, for example, from Sperian Fall Protection of Franklin, Pa.) include stanchions that attach to a support such as a steel I-beam or other support. U.S. Pat. No. 6,722,470, the disclosure of which is incorporated herein by reference, for example, discloses a number of horizontal lifeline systems in which several stanchions are attached to a beam or other support. The stanchions are spanned by a horizontal lifeline to which one or more lanyards can be attached.

Horizontal lifeline systems and stanchion systems for use therein are also disclosed in U.S. Pat. Nos. 5,307,897, 6,173,809, 6,412,598, 6,439,344, 6,478,111, 6,688,427 and 6,799,630.

A common problem with many stanchion systems for use with horizontal lifelines and other anchorage systems, particularly when the stanchion system is designed for attachment to a flanged support (for example, a flanged beam such as I-beam or a flanged adaptor), is the requirement that a user secure the attachment system of the stanchion system to the support from underneath. For example, a number of stanchion systems include one or more bolts that are designed to abut and be tightened against the lower surface or underside of an upper flange of an I-beam. To install such a stanchion system, the user must reach underneath the stanchion system and the upper flange of the I-beam to tighten the bolt(s). This action is difficult, time consuming and potentially dangerous. Moreover, such stanchion systems also typically include a cross member or crossbar including a J-shaped or U-shaped seating on one side to seat an edge of the upper flange and an adjustable connection mechanism to secure the seating of the crossbar in secure abutting connection with the edge of the upper flange. In many currently available stanchion systems, it is difficult and/or time consuming to form (and/or maintain) such a secure abutting connection with the edge of the upper flange using the crossbar connector.

Although a number of stanchion systems, stanchion attachment systems for stanchion posts, and horizontal lifelines including stanchion systems are commercially available, it is desirable to develop improved stanchion systems, stanchion attachment systems, and horizontal lifelines including such stanchion systems that reduce or eliminate the above-identified and other problems with currently available stanchion systems, attachment systems for stanchion posts, and horizontal lifelines including stanchion systems.

SUMMARY OF THE INVENTION

In one aspect, the present invention provides a stanchion system, including a stanchion post and an attachment system for attachment to a flange which includes a first edge and a second edge. The attachment system includes a crossbar including an extending section and an abutment member on a first end thereof to abut the first edge of the flange; a base including a passage through which the extending section of the crossbar is movable and a seating for the stanchion post; and a connector including a first section and a second section. The second section of the connector is attachable to the extending section of the crossbar at one of a plurality of incremental positions. The first section of the connector is movable relative to the second section to adjust the position of the first section relative to the abutment member of the crossbar. In several embodiments, the first section is movable relative to the second section to abut the base on a side of the base opposite the side upon which the flange is positioned to adjust the position of the first section relative to the abutment member.

In a number of embodiments, the connector includes an interior passage through which the extending section passes so that the connector is slidable on the extending section to one of the plurality of incremental positions.

At least a portion of either the first section or the second section can, for example, be movably positioned within at least a portion of the other of the first section of the second section.

The first section of the connector can, for example, include threading and the second section can include cooperating threading to enable movement of the first section relative to the second section. In several embodiments, the first section includes a passage in which at least a portion of the second section is positioned. The second section can, for example, include the interior passage through which the extending section of the crossbar passes.

The threading of the first section can be formed on an interior surface of at least a portion of the passage of the first section. The cooperating threading of the second section can be formed on at least a portion of an exterior surface of a generally cylindrical section of the second section.

The second section of the connector can, for example, include an interlocking and/or abutting connection mechanism or attachment to form a connection with the extending section of the crossbar at one of a plurality of positions. In several embodiments, the second section includes an end member including at least one hole therethrough. The extending section of the crossbar can, for example, include a plurality of (incrementally) spaced holes or passages therethrough along the length thereof. The attachment system can further include an abutment or locking element such as a pin to be passed through the at least one hole of the end member and one of the plurality of spaced holes of the extending member that is aligned with the at least one hole of the end member to attach the first section to the extending section of the crossbar at one of the plurality of incremental positions.

The attachment system can further include at least a first clamping surface to contact and/or abut a lower surface of the flange and an adjustment mechanism to adjust the force applied to the lower surface of the flange by the at least one clamping surface. The adjustment mechanism is preferably positioned so that it is above an upper surface of the flange.

The base can, for example, include the first clamping surface and the adjustment mechanism can include at least a first threaded member in operative threaded connection with the base. The first threaded member can be adapted to or be operable to be actuated by a user to contact an upper surface of the flange. In several embodiments, the adjustment mechanism includes at least a second threaded member in operative threaded connection with the base. The second threaded member can also be adapted to or operable to be actuated by the user to contact an upper surface of the flange. The first threaded member can, for example, be positioned on one lateral side of the crossbar and the second threaded member can be positioned on the other lateral side of the crossbar.

The crossbar can, for example, be movable in a direction generally perpendicular to the upper surface of the at least one flange to, for example, enable attachment to flanges of varying thickness.

In several embodiments, the base comprises a first side member, a second side member and a transverse member connected between the first side member and the second side member. Each of the first side member and the second side member can, for example, include a seating to abut the second edge of the flange. A surface of the seating of the first side member can form the first clamping surface to contact the lower surface of the flange; and a surface of the seating of the second side member can form a second clamping surface to contact the lower surface of the flange. The first side member, the second side member and the transverse member can also form the seating for the stanchion post such that the stanchion post can be positioned between the first side member and the second side member and connected thereto. The passage through which the extending section of the crossbar is movable can be formed in the transverse member of the base.

In another embodiment, the first clamping surface can be positioned on or a part of a clamp member that is movable with respect to the base. The adjustment mechanism can be in operative connection with the clamp member to move the clamp member upon actuation of the adjustment mechanism by a user. The adjustment mechanism can, for example, include a threaded member which engages the clamp member via cooperating threading on the clamp member.

In another aspect the present invention provides a horizontal lifeline system including a horizontal lifeline and at least one stanchion system as described above.

In a further aspect, the present invention provides an attachment system for attachment to a flange comprising a first edge and a second edge. The attachment system includes a crossbar including an extending section and an abutment member on a first end thereof to abut the first edge of the flange, and a connector including a first section and a second section. The second section is attachable to the extending section of the crossbar at one of a plurality of incremental positions. The first section is movable relative to the second section to adjust the position of first section relative to the abutment member of the crossbar. The attachment system can, for example, further include a base including a passage through which the extending section of the crossbar is movable. In several embodiments, the first section is movable to abut the base on a side of the base opposite the side upon which the flange is positioned to adjust the position of the first section relative to the abutment member (and, thereby, the position of the abutment member relative to the base).

The first section of the connector can, for example, include threading, and the second section can include cooperating threading to enable movement of the first section relative to the second section. The first section can, for example, include a passage in which at least a portion of the second section is positioned. The second section can, for example, include a passage through which the extending section of the crossbar passes.

The second section can include an end member including at least one hole therethrough. The extending section of the crossbar can include a plurality of incrementally spaced holes or passages therethrough along the length thereof. The attachment system can further include an abutment member or locking member such as a pin to be passed through the at least one hole of the end member and one of the plurality of spaced holes of the extending member that is aligned with the at least one hole of the end member to attach the second section to the extending section of the crossbar at one of the plurality of incremental positions.

In several embodiments, the base further comprises a seating to seat an element to be placed in operable connection with the flange (for example, a seating for a stanchion post).

In another aspect, the present invention provides a stanchion system including a stanchion post and an attachment system adapted or operable to be attached to a support including at least one flange. In that regard, the attachment system includes at least a first clamping surface to contact a lower surface of the flange and apply force to the lower surface of the flange. The attachment system further includes an adjustment mechanism to adjust the force applied to the lower surface of the flange by the first clamping surface. The adjustment mechanism is positioned so that it is above an upper surface of the flange. The attachment system further includes a stanchion post connector or seating to which the stanchion post is attachable.

The attachment system can, for example, include at least one clamp member that is movable and comprises the first clamping surface. The adjustment mechanism can, for example, be in operative connection with the clamp member to move the clamp member upon actuation of the adjustment mechanism by a user. In a number of embodiments, the adjustment mechanism includes a threaded member which engages the clamp member via cooperating threading on the clamp member.

The attachment system can further include a base to which the clamping member is movably connected via the threaded member. The base can include at least one abutment or clamping surface to abut the upper surface of the at least one flange.

The attachment system further includes a crossbar which is movable in a direction generally parallel to the upper surface of the at least one flange. The crossbar can include an abutment member on a first end thereof to contact a first edge of the at least one flange. The attachment member can further include a connector or locking mechanism (for example, as described above) to lock the abutment member of the crossbar in contact with the first edge of the at least one flange.

In another aspect, the present invention provides a horizontal lifeline system including a horizontal lifeline; and at least one stanchion system including a stanchion post and/or an attachment system as described above.

In a further aspect, the present invention provides an attachment system for use in connection with a stanchion post to attach the stanchion post to a support including at least one flange. The attachment system includes at least a first clamping surface to contact a lower surface of the flange and apply force to the lower surface of the flange. The attachment system also includes an adjustment mechanism to adjust the force applied to the lower surface of the flange by the first clamping surface. The adjustment mechanism is positioned so that it is above an upper surface of the flange. The attachment system further includes a stanchion post seating or connector to which the stanchion post is attachable.

In still a further aspect, the present invention provides a connector for attachment to an extending member including a first section, a second section and an interior passage through which the extending section passes so that the connector is slidable on the extending section to one of a plurality of incremental positions. The second section is attachable to the extending section at one of the plurality of incremental positions. The first section is movable relative to the second section to adjust the position of an abutment surface of the first section relative to the second section.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 1 illustrates a front view of an embodiment of a stanchion system of the present invention.

FIG. 2 illustrates a side view of the stanchion system of FIG. 1.

FIG. 3 illustrates a front perspective view of an embodiment of the stanchion system of FIG. 1 attached to an I-beam.

FIG. 4 illustrates a rear perspective view of the stanchion system of FIG. 1 attached to an I-beam.

FIG. 7 illustrates an enlarged, side hidden line view of a portion of the stanchion system of FIG. 1.

FIG. 10 illustrates a side view of the stanchion system of FIG. 1 in position to be attached to an I-beam with the clamp member thereof in a lowered position.

FIG. 11 illustrates a side view of the stanchion system of FIG. 1 attached to an I-beam with the clamp thereof in an upward position, abutting a flange of the I-beam.

FIG. 15A illustrates an enlarged rear perspective view of a crossbar connector of the stanchion system of FIG. 13A in a fully contracted state.

FIG. 15B illustrates an enlarged rear perspective view of the crossbar connector in a fully expanded state.

FIG. 16A illustrates an enlarged side perspective view of the crossbar connector in a fully contracted state.

FIG. 16B illustrates an enlarged side perspective view of the crossbar connector in a fully expanded state.

FIG. 18 illustrates an enlarged front perspective view of the crossbar connector wherein the first section of the connector is disconnected from the second section of the connector.

FIG. 19 illustrates an adaptor suitable to attach a stanchion system of the present invention (the stanchion system of FIGS. 1-11 in the illustrated embodiment) to a concrete beam including rebar.

DETAILED DESCRIPTION OF THE INVENTION

As used herein and in the appended claims, the singular forms "a," "an", and "the" include plural references unless the content clearly dictates otherwise. Thus, for example, reference to "an abutment member" includes a plurality of such abutment members and equivalents thereof known to those skilled in the art, and so forth, and reference to "the abutment member" is a reference to one or more such abutment members and equivalents thereof known to those skilled in the art, and so forth.

In several embodiments, the present invention provides stanchions or stanchion systems which can be installed upon a support such as a steel I-beam as part of, for example, a horizontal life line system. In several embodiments, the stanchions of the present invention may be securely connected or fastened to the support (for example, an I-beam) by a user working above the I beam, as opposed to currently available stanchion systems in which users must reach below the I-beam (or other support) to install the stanchion upon the I-beam (or other support).

Figure 5:
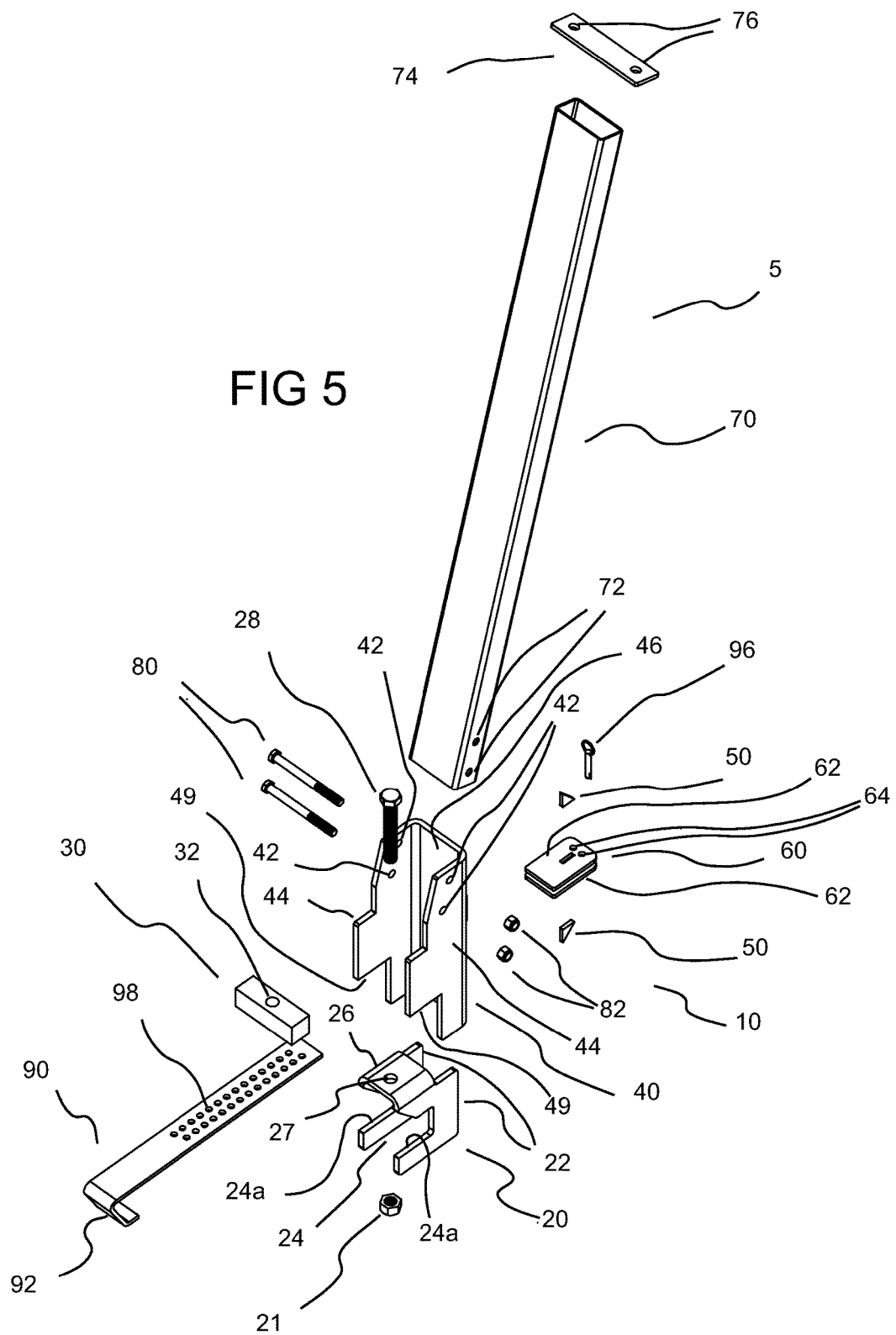
FIG. 5 illustrates a front, exploded or disassembled perspective view of the stanchion system of FIG. 1.
Figure 6:
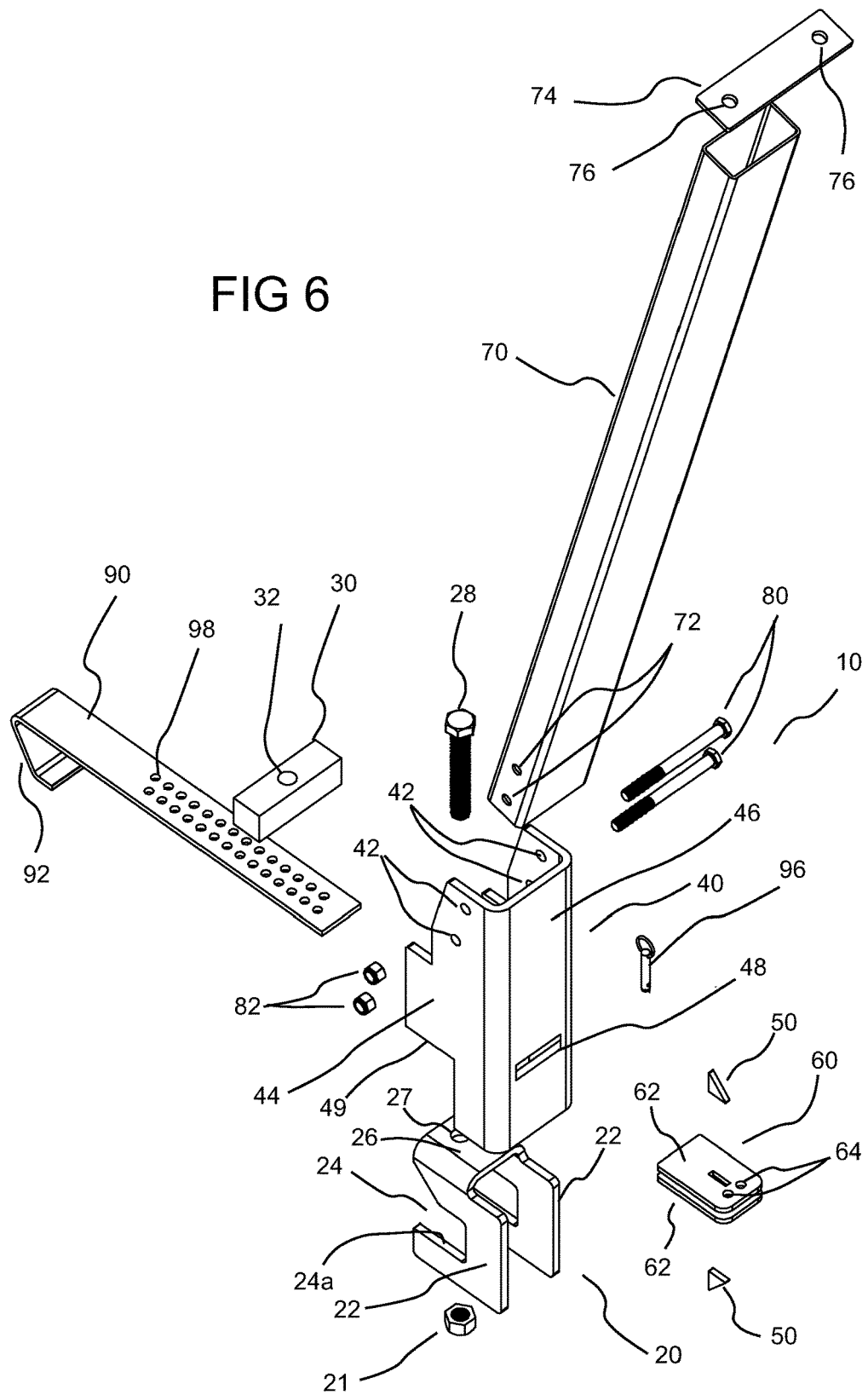
FIG. 6 illustrates a rear, exploded or disassembled perspective view of the stanchion system of FIG. 1.

One embodiment of a stanchion, stanchion assembly or stanchion system 5 of the present invention is illustrated in FIGS. 1 through 11. FIGS. 1 and 2 illustrates stanchion system 5 in an assembled state. FIGS. 3 and 4 illustrates stanchion system 5 installed on a section of a steel I-beam 8. FIGS. 5 and 6 illustrates stanchion system 5 in a disassembled or exploded state.

In the embodiment illustrated in FIGS. 1 through 11, stanchion system 5 includes an attachment system 10 to attach stanchion system 5 to a support such as a flanged support (for example, a flanged beam such as an I-beam) and an extending stanchion post 70 that is (for example, removably) attachable to attachment system 10. Attachment system 10 includes a clamping or clamp member 20, a base or body 40 and a crossbar 90.

As described above, attachment system 10 includes a mechanism that allows attachment system 10 to be securely attached to the support by a user working above the support. Thus, the user does not have to reach under attachment system 10 or any portion of the support to which attachment system 10 is connected to secure that connection. In the illustrated embodiment, clamp member 20 can be raised or lowered relative to base 40 via adjustment of a mechanism positioned above the support to which attachment system 10 is connected. A clamp nut 21 is, for example, attached (for example, welded) to clamp member 20, which is movable up a down (in the orientation of FIG. 1 through 11) to abut and apply force to the lower surface or underside of a flange of a support such as an I-beam. In the embodiment of FIGS. 1 through 11, clamp member 20 includes side members 22 which form a generally C-shaped seating 24. Side members 22 are retained in spaced relationship via a cross or transverse member 26 to which, for example, side members 22 can be welded. Clamp nut 21 cooperates with clamp bolt 28 and a clamp bar 30 attached (for example, welded or formed integrally therewith) to an upper portion of the front of base 40.

As used herein, terms such as "rearward", "forward", "upper", "lower" and like terms are used to describe relative position with reference to the orientation of the systems set forth in the accompanying drawing. In general, the upper surface of flange 510 is that surface opposite the surface (that is, the lower surface) of flange 510 from which section 520 extends to meet flange 130 (see, FIGS. 3 and 4). Positions above flange 510 (and above support or beam 500) are positions closer to the upper surface of flange 510 than to the lower surface thereof.

In the embodiment of stanchion system 5, clamping member 20 is movably attached to base 40. For example, in one embodiment, a threaded member such as a clamp bolt 28 passes through a hole 32 in clamp bar 30. Threaded clamp bolt 32 threads into a threaded passage 27 formed in cross member 26 of clamp member 20. In the embodiment of FIGS. 1-11, clamp member 20 is dimensioned so that it is free to slide vertically within side members 44 of base 40. Tightening (clockwise rotation) of clamp bolt 28 causes clamp member 20 to be drawn upward, while loosening (counterclockwise rotation) of clamp bolt 28 allows clamp member 20 to lower. As clear to one skilled in the art, a clamp member of the present invention, similar to clamp member 20, can alternatively be dimensioned so that side members of the clamp member (similar to side member 22) slide vertically outside of side members 44 of base 50. Moreover, more than one clamp member can be provided. For example, a cross member such as cross member 26 can be eliminated and separate clamp bolts can be provided to separately control side members such as side members 22.

In the embodiment of FIGS. 1-11, a crossbar 90 is slidably movable between spaced guide members 62 of guide brackets 60. As illustrated, for example, in FIGS. 7, 10 and 11, crossbar 90 abuts a first or forward edge of upper flange 510 of an I-beam 500 via, for example, a hook-shaped abutment member 92 on a forward end of crossbar 90, while seating 24 of clamp member 20 abuts a second or rearward edge of flange 510, to securely mount stanchion system 5 to I-beam 500. As illustrated, for example, in FIGS. 6 and 7, extension bar 90 is slidably mounted through a slot 48 formed in a rear, transverse member 46 (connected between side members 44) of base 40 to pass between spaced guide members 62 of guide brackets 60. Bracket guide members 62 include holes 64 that are alignable with holes 98 in crossbar 90 to fix or lock crossbar 90 in a desired position using, for example, one or more lock or ring pins 96. In that regard, crossbar 90 is held in one of several positions by a ring pin or pins 96 which pass through one of holes 64 in the guide bracket 60 and through one of the plurality of holes 98 formed in cross bar 90. The choice of holes 98 provides incremental adjustment of how far crossbar 90 extends from the front of base 40.

In several embodiments, gussets 50 are attached (for example, welded) to guide bracket 60 which is, in turn, attached (for example, welded) to the back of the base 40.

Figure 8A:
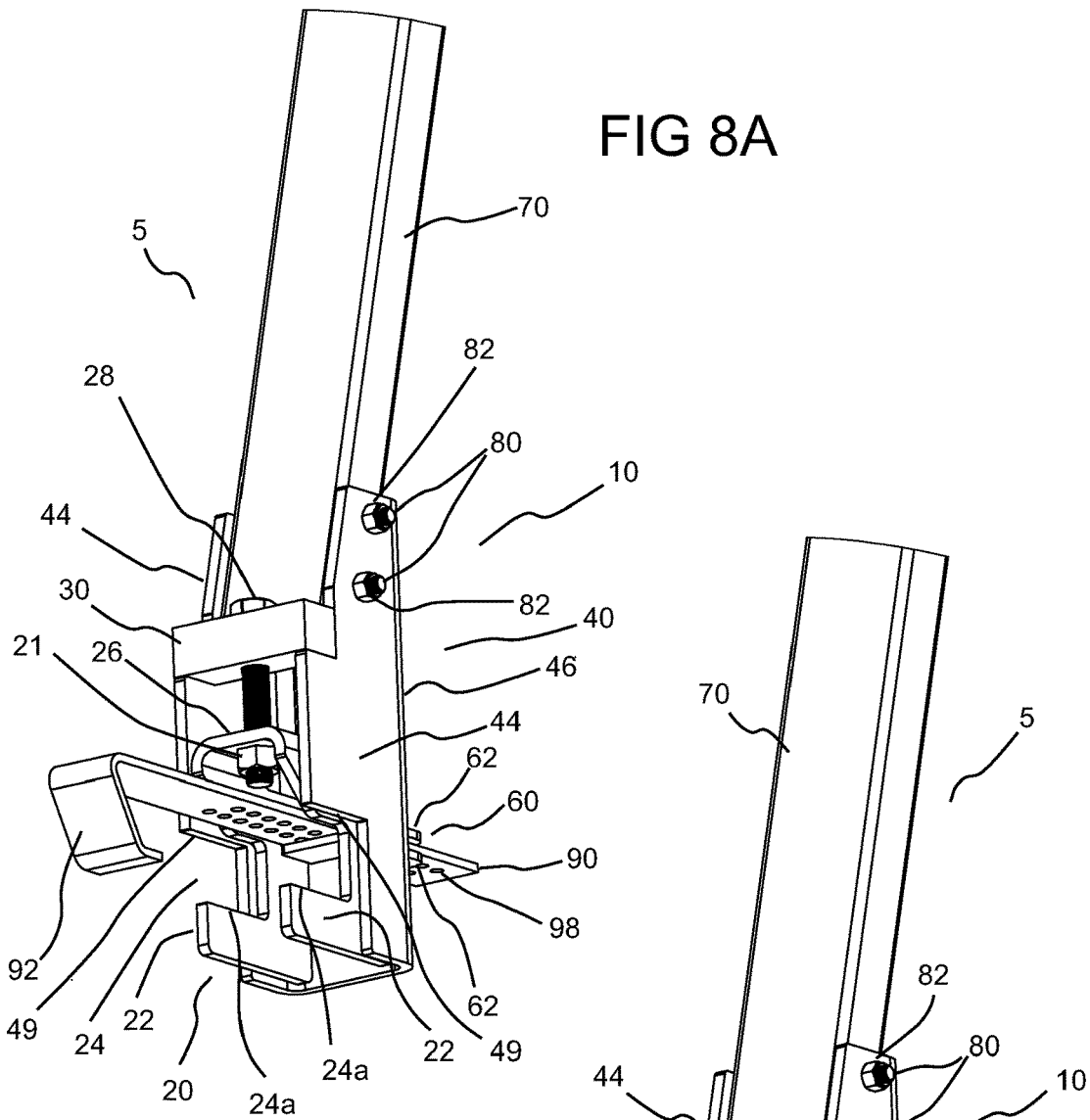
FIG. 8A illustrates a front perspective view of a portion of the stanchion system of FIG. 1 with a clamp member thereof in a fully lowered position.
Figure 9:
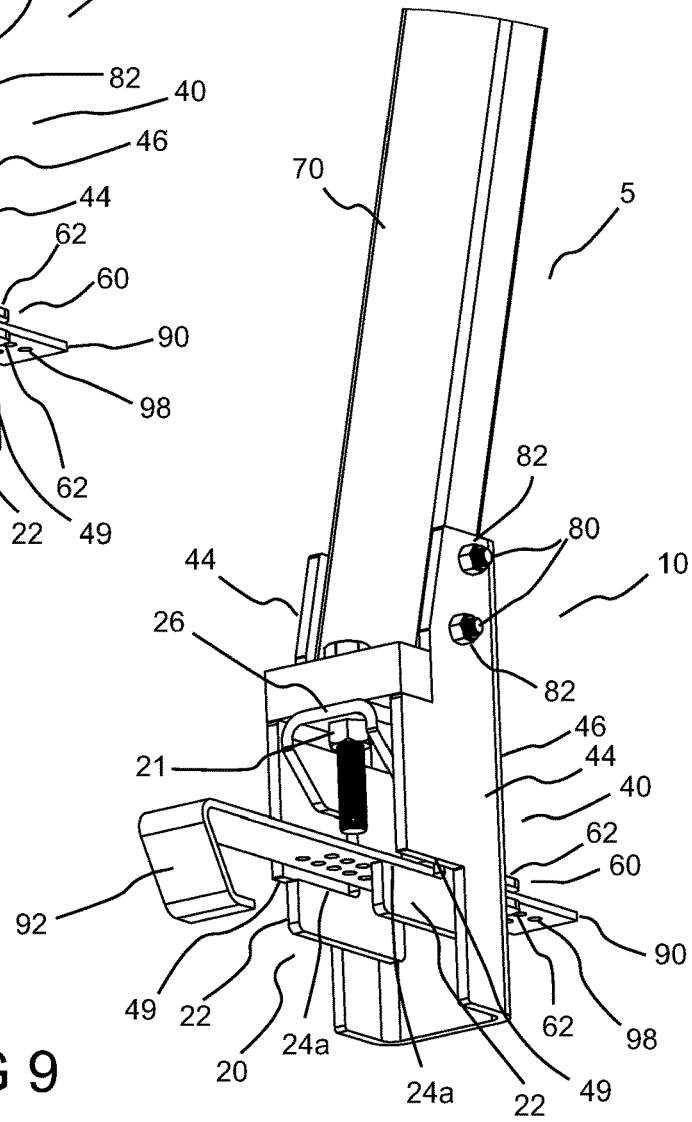
FIG. 9 illustrates a front perspective view of a portion of the stanchion system of FIG. 1 with a clamp member thereof in a fully raised or upward position.
Figure 8B:
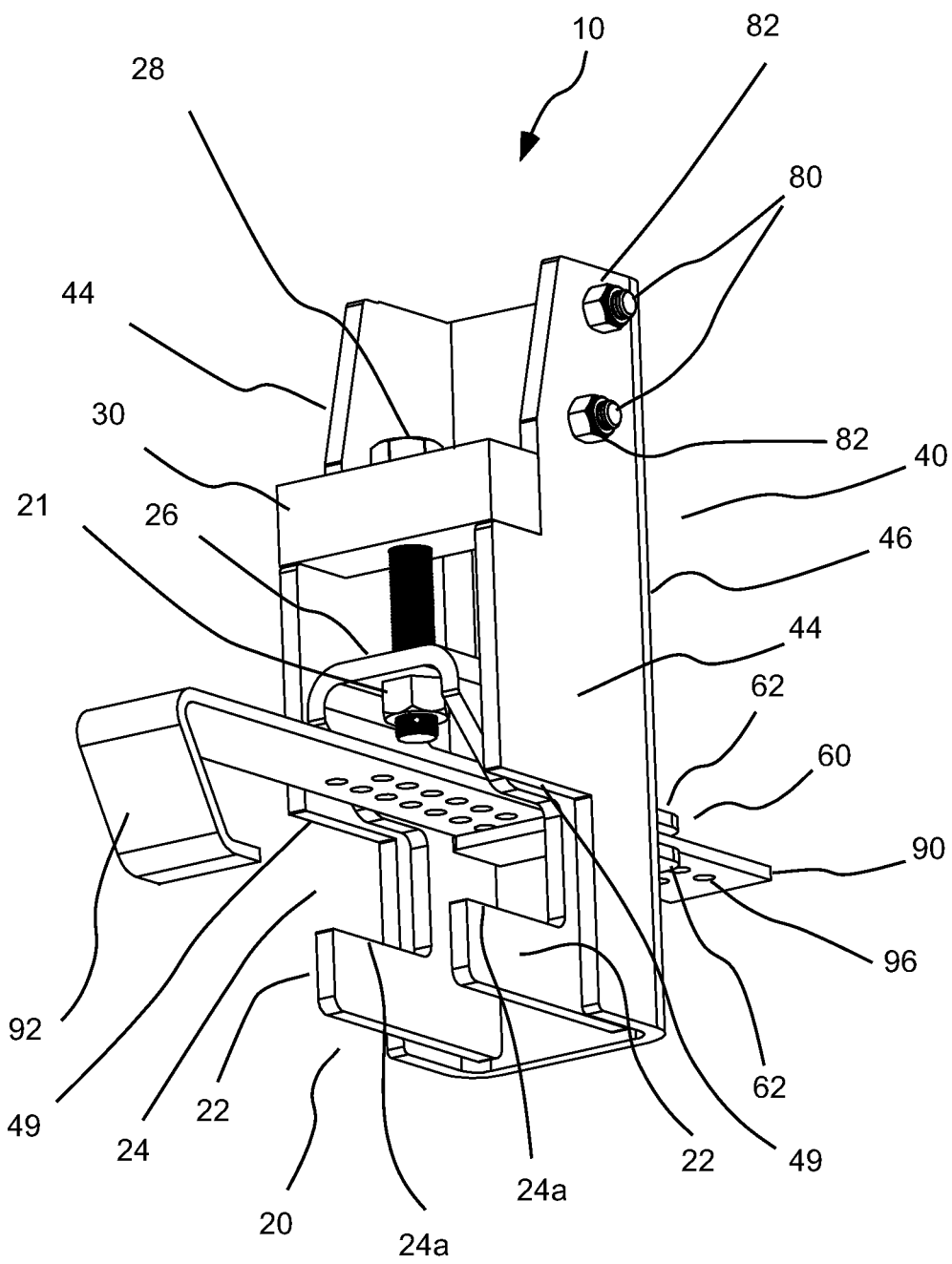
FIG. 8B illustrates an enlarged front perspective view of the attachment system of the stanchion system of FIG. 1 with a clamp member thereof in a fully lowered position.

FIGS. 8A, 8B and 10 illustrate stanchion system 5 with clamp member 20 in a fully lowered position. In the fully lowered position, the distance between clamping surfaces 24a of side members 22 of clamping member 20 (forming the lower portion of C-shaped seating 24) and abutment or clamping surfaces 49 of side members 44 of base 40 is at a maximum. FIG. 9 illustrate stanchion system 5 with clamp 20 is a fully upward position, wherein the distance between clamping surfaces 24a and surfaces 49 is at a minimum.

FIGS. 7 and 10 illustrate stanchion system 5 in place upon I beam 500. Crossbar 90 has been positioned so that hook-shaped abutment member or end 92 has engaged the first or forward edge of upper flange 510 of I-beam 500 opposite stanchion base 40 and the second or rearward edge of upper flange 510 is engaged by side members 44 of base 40 and by side member 22 of clamp member 20. Ring pin 96 has been placed in the appropriate hole 98 of crossbar 90 to keep crossbar 90 in position.

Once again, in FIG. 10 clamp 20 is shown in its lowest position with the maximum opening between clamping surfaces 24a and abutment surfaces 49. In FIG. 11, the user has tightened clamp bolt 28, causing clamp member 20 to move upward or rise until clamping surfaces 24a have contacted the lower surface of upper flange 510 of I-beam 500. Continuing to tighten clamp bolt 28 results in I-beam flange 510 being tightly gripped between clamping surfaces 24a and abutment or clamping surfaces 49.

Stanchion post 70 can, for example, be fastened to base 40 of attachment system 10 after attachment of attachment system 10 to I-beam 500 (or other support) by one or more connectors such as two bolts 80 and two cooperating nuts 82 that pass through passages 42 in side members 44 of base 40 and passages 72 in stanchion post 70. The generally U-shaped upper portion of base 40 forms a seating or connector for stanchion post 70 wherein stanchion post 70 can be seated between side members 44 and connected thereto as described above. In several embodiments, base 40 was formed integrally from a piece of metal (for example, stainless steel).

A connector member 74 is attached (for example, welded) to the top of the stanchion post 70. Various mechanisms (such as an intermediate post cable guide) can, for example, be attached to connector member 74 via, for example, a connector or connector mechanism such as holes 76 in connector member 74. Likewise, a horizontal lifeline 210 (see, for example, FIG. 14A) can be attached directly to one or more of holes 76.

Figure 12:
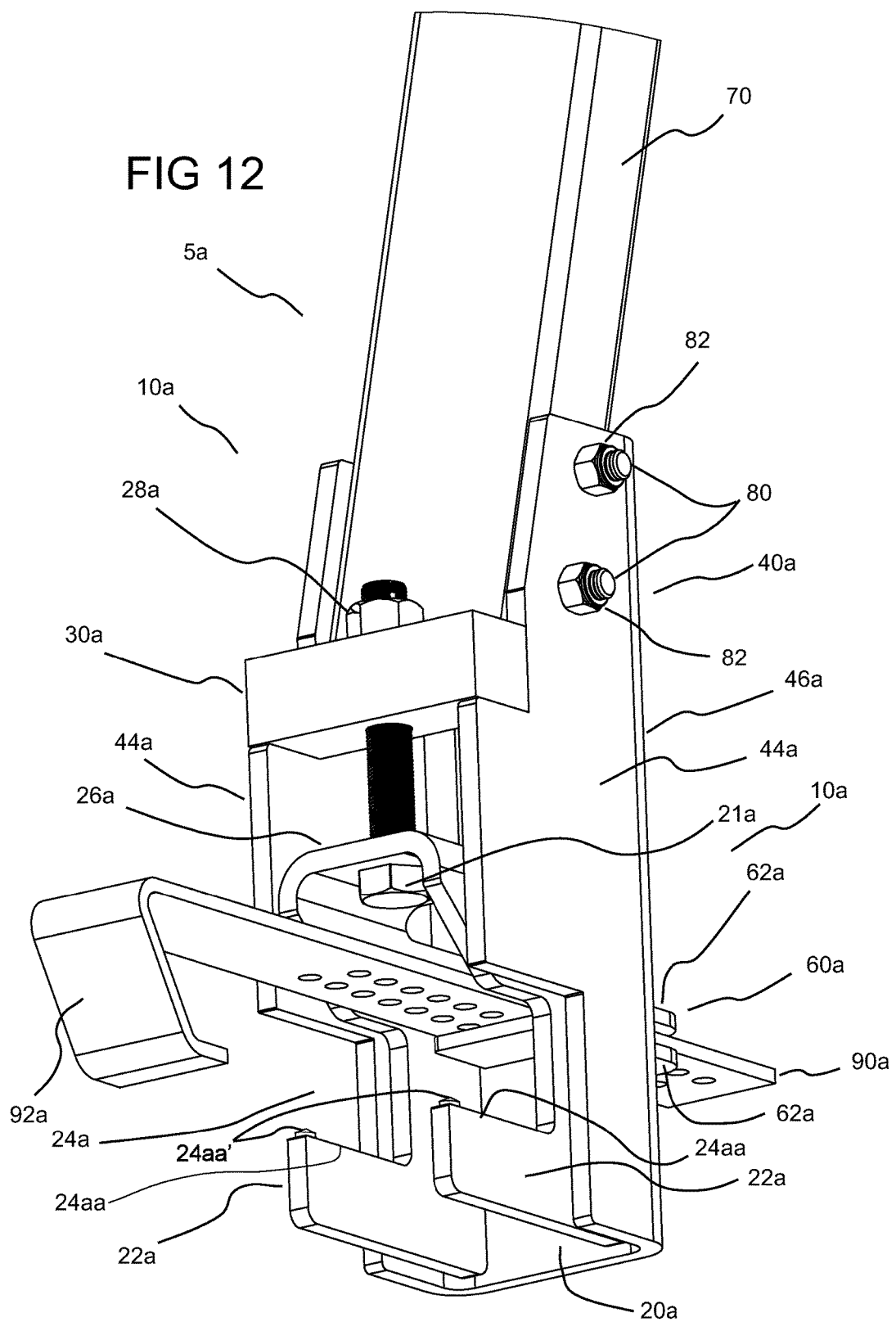
FIG. 12 illustrates a front perspective view of a portion of another embodiment of a stanchion system of the present invention in which a clamp bolt is welded to a clamp member thereof and a clamp nut is turned to raise (or lower) the clamp.

FIG. 12 illustrates another embodiment of a stanchion system 5a that operates in a very similar manner to stanchion system 5. In FIG. 12, like elements are numbered in the same manner as corresponding elements of stanchion system 5 with the addition of the designation "a" thereto. In the embodiment of stanchion system 5a, clamp bolt 21a is welded to clamp member 20a, and a clamp nut 28a is rotated clockwise to raise clamp member 20 during installation on an I-beam. As also illustrated in FIG. 12, clamping surfaces 24aa can include hardened members 24aa' that assist in forming a secure attachment of attachment system 10a to a flange.

In several other embodiments, the present invention provides connectors or connector systems that can be used as crossbar connector. Such crossbar connectors are particularly suited for use with stanchions or stanchion systems and facilitate secure attachment of the stanchion systems upon a support such as a steel I-beam as part of, for example, a horizontal life line system. In several representative embodiments, the connectors or stanchions systems of the present invention are described in connection with stanchion systems similar to systems 5 and 5a as described above that may be securely connected to or fastened to the support (for example, an I-beam) by a user working above the I beam. Like stanchion systems 5 and 5a, stanchion system 5b can also be fastened to a support such as an I-beam from above the support (for example, above the upper flange of the I-beam). However, one skilled in the art appreciates that the connectors of the present invention can be used with many different stanchion (or other) systems to be attached to a flanged support and can be incorporated into currently available stanchion (or other) systems.

Figure 13A:
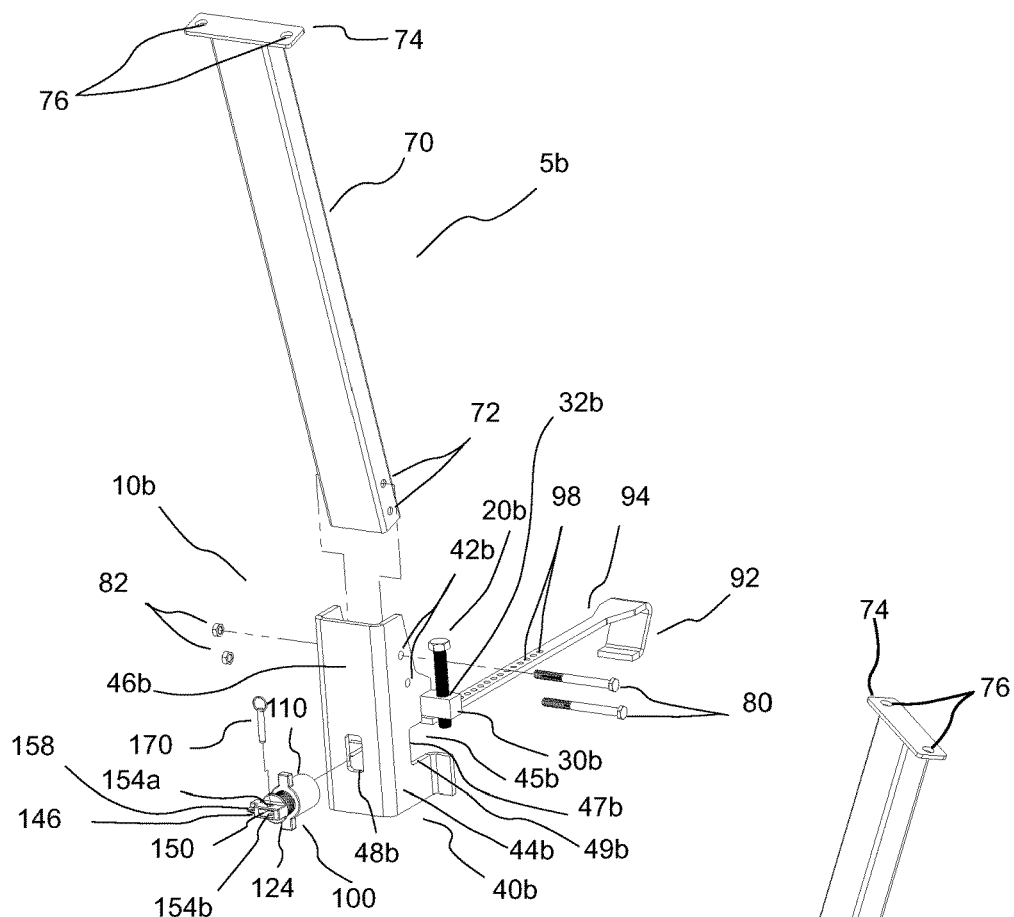
FIG. 13A illustrates a rear perspective view of another embodiment of a stanchion system of the present invention in an exploded or disconnected state.
Figure 13B:
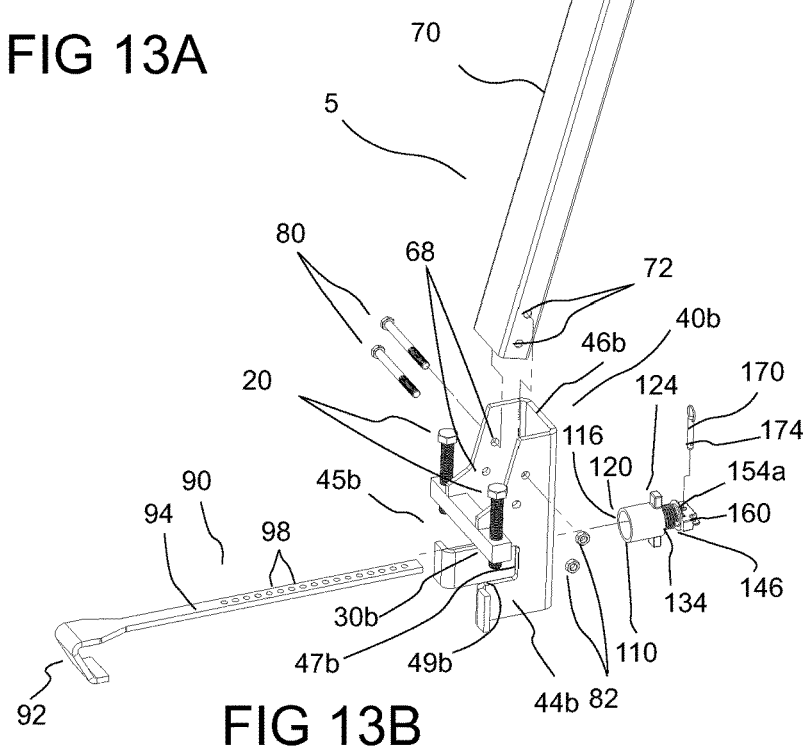
FIG. 13B illustrates a front perspective view of the stanchion system of FIG. 13A in an exploded or disconnected state.

One embodiment of a stanchion, stanchion assembly or stanchion system 5b of the present invention is illustrated in FIGS. 13A through 18. FIGS. 13A through 13C illustrate stanchion system 5b in an disassembled state. FIGS. 14A and 14B illustrates several stanchion systems 5b installed on a section of steel I-beam 500 to form a horizontal lifeline system 300. FIGS. 13A through 18 illustrate an embodiment of a crossbar connector or position adjuster 100 of stanchion system 5b.

In the embodiment illustrated in, for example, FIGS. 13A through 14B, stanchion system 5 includes an attachment system 10b to attach stanchion system 5b to a support such as a flanged support (for example, a flanged beam such as I-beam 500) and an extending stanchion post 70 (as described above) that is removably attachable to attachment system 10b. Attachment system 10b includes at least one clamp mechanism or clamp member 20b, a base or body 40b, a crossbar 90 as described above and crossbar connector 100. Attachment system 10b also includes a post attachment or seating to connect (for example, removably connect) stanchion post 70 or an/or another element to attachment system 10b.

Similar to attachment systems 10 and 10a, attachment system 10b includes a mechanism that allows attachment system 10b to be securely attached to the support (for example, I-beam 500) by a user working above the support. Thus, the user does not have to reach under attachment system 10b or any portion of the support to which attachment system 10b is connected to secure that connection. In the embodiment, illustrated in FIGS. 13A through 14B, clamp members included threaded bolts 20b that can be raised or lowered relative to upper flange 510 of I-beam 500 to which attachment system 10b is connected. As illustrated in FIGS. 2A and 2B, threaded bolts 20b are tightened against an upper surface of flange 510 to abut and apply force to the upper surface of flange 510. In the illustrated embodiment, clamp members 20b pass through threaded holes 32b formed in a support or clamp member or bar 30b that is attached to (for example, welded to) or formed integrally with base 40b. Clamp bar 30b extends laterally beyond the position of side members 44b of base 40b. Side members 44b of base 40b (which are connected by a transverse back member 46b) include a generally C-shaped seating 45b in which a rearward end or edge of flange 510 is seated (against back or rearward surfaces 47b of seatings 45b of side members 44b). Threaded bolts 20b are adjusted relative to clamp bar 30b to apply force to the upper surface of flange 510, thereby forcing or clamping flange 510 against an upward facing, clamping surface 49b of each of side members 44b. In one embodiment, base 40b, including side members 44b and transverse member 46b and components thereof, was formed (integrally) from a single piece of metal (for example, stainless steel).

As described above, terms such as "rearward", "forward", "upper", "lower" and like terms are used to describe the relative position of elements of the systems of the present invention with reference to the orientation of the systems set forth in the accompanying drawings.

Crossbar 90 is slidably movable through a passage 48b formed in transverse member 46b. As illustrated, for example, in FIGS. 14A and 14B, crossbar 90 abuts a first or forward edge of an upper flange 510 of an I-beam 500 via, for example, generally hook-shaped abutment or clamping member 92 on a first or forward end of an extending section 94 of crossbar 90. Abutment member 92 abuts and can apply force to the first edge of flange 510, securing second or rearward edge of flange 510 against surfaces 47b of side members 44b of base 40b, to assist in securely mounting stanchion system 5b to I-beam 500.

Crossbar 90 is thus movable or slidable through passage 48b in a direction generally parallel to the upper surface of upper flange 510 so that, for example, the position of abutment member 92 can be readily adjusted to abut the first or forward edge of flange 410. Passage 48b can also extend in a generally vertical direction (see, for example, FIG. 13A) so that crossbar 90 is also movable therein in a direction generally perpendicular to the upper surface of flange 510 to, for example, enable secure attachment to flanges of varying thickness.

Extending section 94 passes over the upper surface of flange 510 and through passage 48b to form a connection with connector 100, which is operable to adjust the position of abutment member 92 relative to connector 100 and base 40b. As illustrated, for example, in FIGS. 15A through 18, connector 100 includes a first member or section 110 and a second member or section 130. As, for example, illustrated in FIG. 18, first section 110 and second section 130 are connected via threading 114 formed around at least a portion of a generally cylindrical passage 116 (see, for example, FIG. 18) of generally cylindrical section 112 of first section 110 and cooperating threading 134 formed on a generally cylindrical extending section 138 of second section 130. Forming at least a portion of first section 110 and a portion of second section 130 as generally concentric cylinders through which extending section 94 can pass affords compactness, efficiency in positioning connector 100 on extending section 94, and efficiency in providing relative movement between end member 146 of second section 130 and a forward or abutment surface 120 of first section 110 to form a secure connection as discussed below. Although second section 130 is shown to be threadably engaged within a portion of first section 110 in the illustrated embodiment, one skilled in the art appreciates that the first and second sections can be dimensioned and designed so that the first/forward section is threadably engaged within a portion of the second/rearward section.

During installation of stanchion system 5b, connector 100 is slid over extending section 94 of crossbar 90 by movement in a first direction in a first path generally along the length of the crossbar so that extending section 94 passes through passage 116 of first section 110 and passage 142 (see, for example, FIG. 17A) formed through section 138 of second section 130 (which is at least partially positioned within passage 116). First section 130 includes a connection or attachment mechanism that attaches connector at a desired incremental position on extending section 94. In the illustrated embodiment, extending section 94 exits second section 130 via a passage 150 (see, for example, FIGS. 15A and 15B), which is a portion of or in communicative connection with passage 142, and is formed in an end member 146 of second section 130. End member 146 includes holes or passages 154a and 154b formed on each side of passage 150. A locking member such as a ring pin 170 can be slid through one of holes 154a and 154b to pass through one of holes or passages 98 formed along the length of extending member 94 and then through the other of holes 154a and 154b to connect connector 100 to extending section 94. The choice of one of holes 98 provides incremental adjustment of the position abutment member 92. Pin 170 can, for example, include a spring loaded abutment element 174 as know in the art to ensure that pin 170 is not accidentally removed from connection with end member 146 and extending bar 94. End member 146 can, for example, include an attachment element such as a hole or passage 158 via which pin 170 can be attached to end member 146 via a tether 160 (see FIG. 14B) so that pin 170 is readily available for insertion within holes 154a and 154b as described above.

Other types of, for example, abutting or interlocking connections between second section 130 and extending section 94 as known in the connector arts can be made to position second section 130 at one of a plurality of positions on extending section 94. Once end member 146 is fixed in one of the plurality of positions relative to extending section 94, first section 110 is movable relative to second section 130 (via threading 114 and cooperating threading 134) to adjust the position of a forward or abutment surface 120 of first section 110 so that it firmly abuts traverse member 46b of base 40b. First section 110 can include extending flanges 124 to facilitate rotation thereof by an installer of stanchion system 5b. The ability to adjust the position of first section 110 relative to second section 130 (and relative to abutment member 92) provides fine tuning or adjustment of the position of abutment member 92 of crossbar 90 and the force applied thereby upon the first edge of flange 510. Turning of the first section 110 in one direction causes the first section 110 to move in the first direction in the first path relative to the second section 130 and the extending section 94 of the crossbar 90 to secure the attachment system 10 to the beam flange 510.

The fine adjustment provided by first section 110 of connector 100 enables a more secure connection of attachment system 10b and stanchion system 5b to a flanged support or anchor than is possible with many currently available stanchion systems. The motion of first section 110 relative to second section 130 provides adjustment of the position of abutment member 92 relative to, for example, abutment surfaces 47b, to positions between the incrementally spaced positioning provided by the cooperation of pin 170, second section 130 and holes 98 of extending section 94. In the illustrated embodiment, the cooperation of threading 114 and 134 provides continuous adjustment of position to any position between the incremental positions provided by holes 98.

A number of currently available stanchion systems include a crossbar member that is threaded so that a threaded connector can be threaded onto the back thereof and advanced to lock the crossbar in place. Connector 100 of the present invention provides the continuous adjustability of a threaded connecter but, unlike previous threaded connectors, does not need to be threaded onto a crossbar member at the start of installation, which can be very cumbersome and time consuming. Moreover, connector 100 does not need to be rotated/threaded over the entire length of the crossbar for advancement to secure the stanchion system. Crossbars can, for example, be up to 36 inches in length and it can take some time to thread currently available threaded connectors to a desired position.

Connector 100 provides for easy and quick initial installation on crossbar 90. Once connector 100 is slid onto the end of extending section 94 of crossbar 90, one can then quickly slide connector 100 in the first direction in the first path to a desired incremental position on extending section 94 (without rotating/threading) until a relatively close fit is obtained. The user can then quickly drop pin 170 into respective aligned hole 98 and turn first section 110 only, for example, a few turns for secure abutment with transverse member 46b. Moreover, even if first section 110 of connector 100 should accidentally be rotated out of abutment with transverse member 46b, the locked position of second section 130 maintains connector 100 in relatively close connection with transverse member 46b via an abutment or interlocking connection as, for example, created by the cooperation of pin 170 with holes 154a, 154b and 98.

Figure 14A:
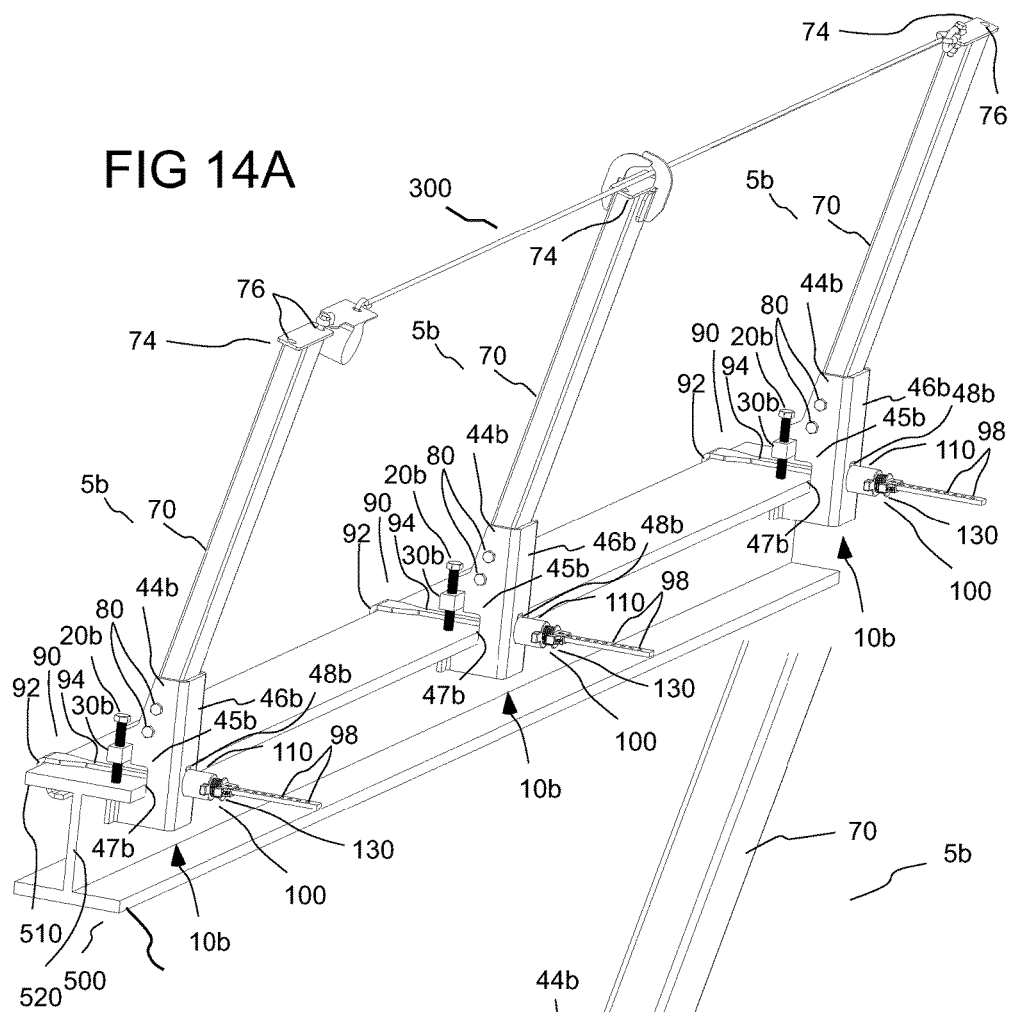
FIG. 14A illustrates perspective view of several of the stanchion systems of FIG. 13A attached to an I-beam with a horizontal lifeline connected therebetween to form a horizontal lifeline system.
Figure 14B:
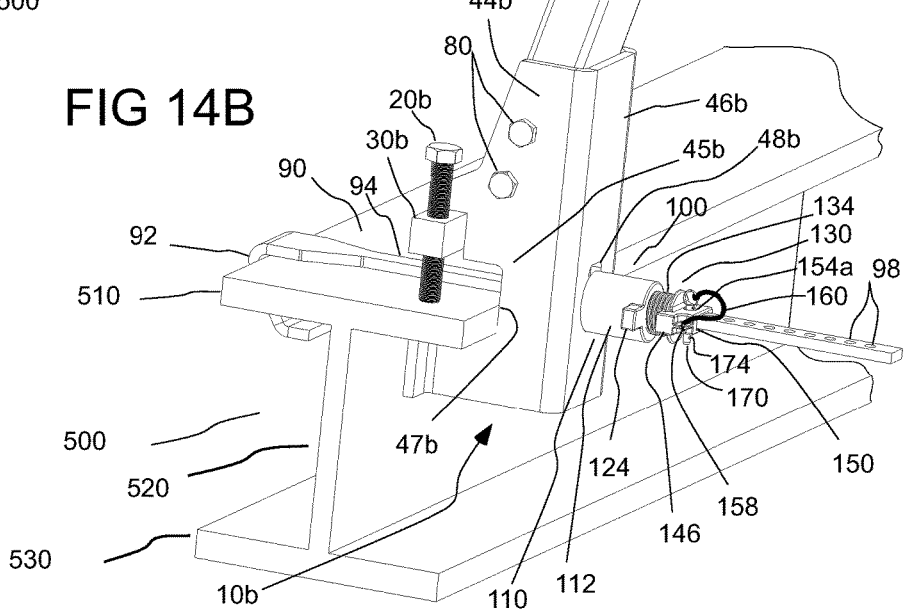
FIG. 14B illustrates an enlarged perspective view the attachment of one of the stanchion systems of FIG. 13A to the I-beam.
Figure 17A:
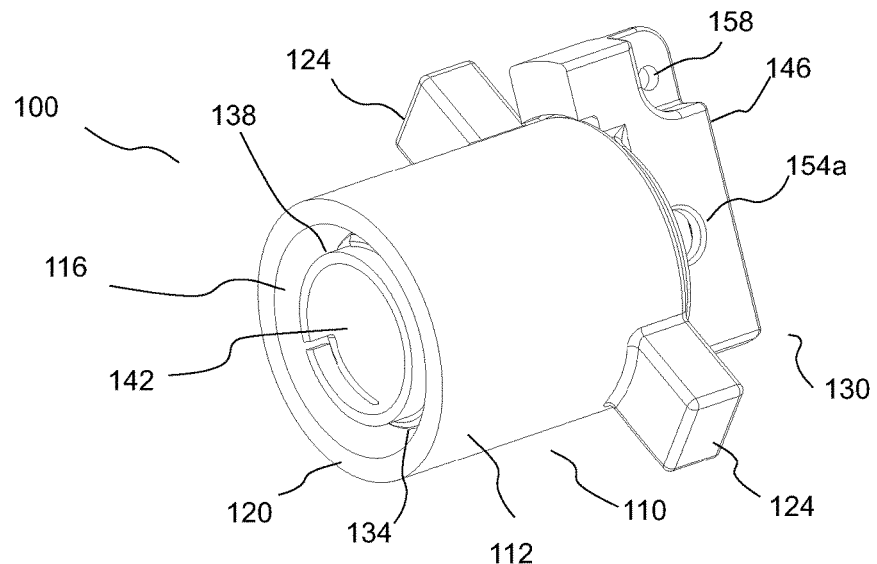
FIG. 17A illustrates an enlarged front perspective view of the crossbar connector in a fully contracted state.
Figure 17B:
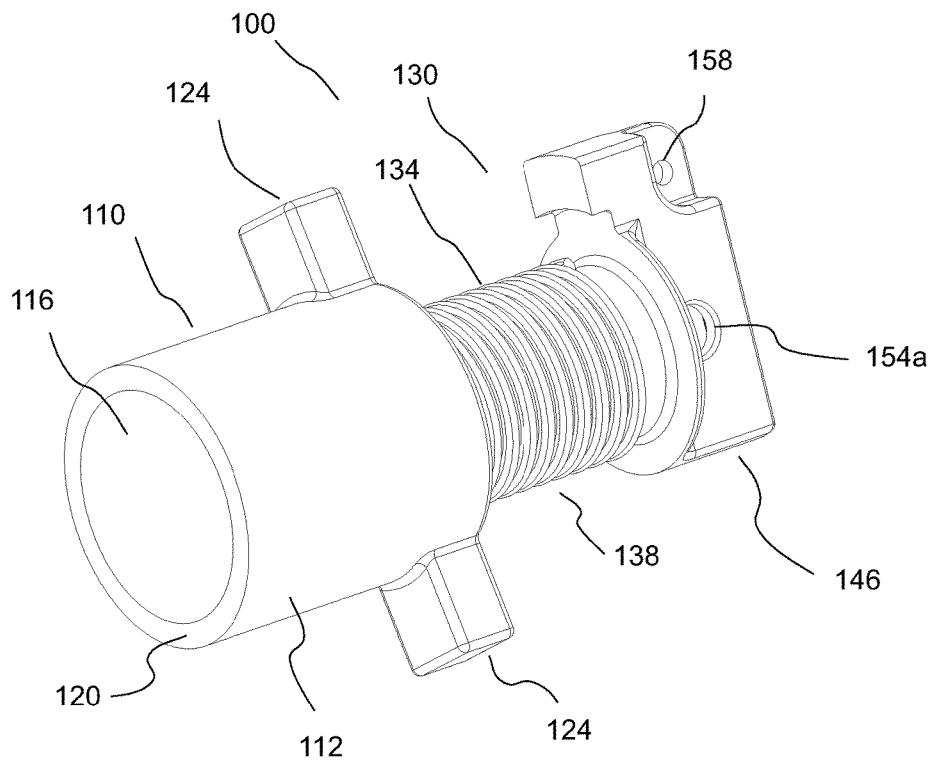
FIG. 17B illustrates an enlarged front perspective view of the crossbar connector in a fully expanded state.

As described above, stanchion post 70 can, for example, be attached to a generally U-shaped stanchion post seating formed by spaced side members 44b and transverse member 46b once attachment system 10b is secured to beam 500 as described above. As illustrated in FIG. 14A, a horizontal lifeline 300 can be connected between stanchion systems 5b as know in the art.

Although flanged beams such as I-beam 500 are used throughout the construction industry, it is desirable to develop an anchorage system that can be used in a wide variety of settings, even when flanged beams are unavailable. As described above, stanchion posts 70 are removably attachable to the attachment systems. To connect stanchion posts 70 to a different type of support (for example, a concrete support including extending rebar), a different type of attachment system can be used.

As known in the art, an adaptor can be used in connection with the attachment systems of the present invention to attach stanchion posts 70 to a different type of support. For example, FIG. 19 illustrates a system 400 of the present invention in which stanchion systems 5 is adaptable for use with a number of anchorage elements or supports other than a flanged beam such as an I-beam. In FIG. 19, a steel reinforced concrete beam 700 is illustrated with steel rebars 710 exiting the concrete on a top surface of beam 700. As common in the construction industry, rebars 710 form loops and reenter concrete beam 700. Stanchion systems 5, 5a and 5b cannot be attached directly to steel reinforced concrete beam 500. In system 400, an adapter 410 is used to attach any one of stanchion systems 5, 5a and/or 5b to concrete beam 700.

Adapter 410 (as, for example, disclosed in U.S. Pat. No. 6,722,470) includes at least one attachment member to attach adapter 410 to an anchorage other than a flanged beam such as I-beam 100. In the embodiment of FIG. 19, the attachment mechanism includes two attachment members such as clips, clamps or brackets 420 that attach to looped rebars 510. Adapter 410 includes a front upper flange 412 and rear upper flange 414 that together provide an attachment flange similar in overall structure and operation to flange 110 of I-beam 100. Adapter 410 also includes a front lower flange 416 and a rear lower flange 418, which increase the stability of adapter 410 on beam concrete beam 700. Upper flanges 412 and 414 and lower flanges 416 and 418 extend from and are connected by a generally vertical member 430. In the embodiment of FIG. 19, lower flange 418 is preferably sufficiently narrow to pass between rebars 510 to suitably position adapter 410 on reinforced concrete beam 700.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A stanchion system, comprising:
a stanchion post and
an attachment system for attachment to a flange comprising a first edge and a second edge, comprising:
    a crossbar comprising an extending section and an abutment member on a first end thereof to abut the first edge of the flange,
    a base comprising a passage through which the extending section of the crossbar is linearly movable and a seating for the stanchion post, and
    a connector comprising a first section and a second section, the second section being attachable to the extending section of the crossbar at each of a plurality of incremental positions independent of attachment of the first section to the extending section, the first section engaged with the second section to be linearly movable along the extending section independent of movement of the second section along the extending section to thereby clamp the attachment system to the flange with the second section attached at a selected one of the plurality of incremental positions.

2. The stanchion system of claim 1 wherein the first section is movable relative to the second section to abut the base on a side of the base opposite the side upon which the flange is positioned to adjust the position of the first section relative to the abutment member.

3. A stanchion system, comprising:
a stanchion post and
an attachment system for attachment to a flange comprising a first edge and a second edge, comprising:
    a crossbar comprising an extending section and an abutment member on a first end thereof to abut the first edge of the flange,
    a base comprising a passage through which the extending section of the crossbar is linearly movable and a seating for the stanchion post, and
    a connector comprising a first section and a second section, the second section being attachable to the extending section of the crossbar at each of a plurality of incremental positions independent of attachment of the first section to the extending section, the first section being movable relative to the extending and second sections in a first path in a first direction to thereby clamp the attachment system to the flange with the second section attached at a selected one of the plurality of incremental positions;
wherein the second section includes an interior passage through which the extending section passes so that the second section is linearly slidable on the extending section to each of the plurality of incremental positions independent of rotation of the second section relative to the extending section and wherein at least a portion of either the first section or the second section is positioned within at least a portion of the other of the first section of the second section.

4. A stanchion system, comprising:
a stanchion post and
an attachment system for attachment to a flange comprising a first edge and a second edge, comprising:
    a crossbar comprising an extending section and an abutment member on a first end thereof to abut the first edge of the flange,
    a base comprising a passage through which the extending section of the crossbar is movable and a seating for the stanchion post, and
    a connector comprising a first section and a second section, the second section being attachable to the extending section of the crossbar at one of a plurality of incremental positions, the first section being linearly movable relative to the second section to adjust the position of the first section relative to the abutment member of the crossbar;
wherein the first section is movable relative to the second section to abut the base on a side of the base opposite the side upon which the flange is positioned to adjust the position of the first section relative to the abutment member;
the second section includes an interior passage through which the extending section passes so that the second section is linearly slidable on the extending section to each of the plurality of incremental positions independent of rotation of the second section relative to the extending section and wherein at least a portion of either the first section or the second section is positioned within at least a portion of the other of the first section of the second section;
the first section of the connector comprises threading and the second section comprises cooperating threading to enable movement of the first section relative to the second section; and
wherein the first section comprises a passage in which at least a portion of the second section is positioned, the second section comprising the interior passage through which the extending section of the crossbar passes.

5. A stanchion system comprising:
a stanchion post and
an attachment system for attachment to a flange comprising a first edge and a second edge, comprising:

a crossbar comprising an extending section and an abutment member on a first end thereof to abut the first edge of the flange, a base comprising a passage through which the extending section of the crossbar is movable and a seating for the stanchion post, and a connector comprising a first section and a second section, the second section being attachable to the extending section of the crossbar at one of a plurality of incremental positions, the first section being movable relative to the second section to adjust the position of the first section relative to the abutment member of the crossbar;

wherein the first section is movable relative to the second section to abut the base on a side of the base opposite the side upon which the flange is positioned to adjust the position of the first section relative to the abutment member;

the second section includes an interior passage through which the extending section passes so that the second section is linearly slidable along on the extending section to each of the plurality of incremental positions independent of rotation of the second section relative to the extending section and wherein at least a portion of either the first section or the second section is positioned within at least a portion of the other of the first section of the second section;

the first section of the connector comprises threading and the second section comprises cooperating threading to enable movement of the first section relative to the second section; and wherein the first section comprises a passage in which at least a portion of the second section is positioned, the second section comprising the interior passage through which the extending section of the crossbar passes, wherein the threading of the first section is formed on an interior surface of at least a portion of the passage of the first section and the cooperating threading of the second section is formed on at least a portion of an exterior surface of a generally cylindrical section of the second section.

6. A stanchion system comprising:

a stanchion post and an attachment system for attachment to a flange comprising a first edge and a second edge, comprising:

a crossbar comprising an extending section and an abutment member on a first end thereof to abut the first edge of the flange, a base comprising a passage through which the extending section of the crossbar is movable and a seating for the stanchion post, and a connector comprising a first section and a second section, the second section being attachable to the extending section of the crossbar at one of a plurality of incremental positions, the first section being movable relative to the second section to adjust the position of the first section relative to the abutment member of the crossbar;

wherein the first section is movable relative to the second section to abut the base on a side of the base opposite the side upon which the flange is positioned to adjust the position of the first section relative to the abutment member;

the connector includes an interior passage through which the extending section passes so that the connector is linearly slidable on the extending section to each of the plurality of incremental positions and wherein at least a portion of either the first section or the second section is positioned within at least a portion of the other of the first section of the second section;

the first section of the connector comprises threading and the second section comprises cooperating threading to enable movement of the first section relative to the second section; and wherein the first section comprises a passage in which at least a portion of the second section is positioned, the second section comprising the interior passage through which the extending section of the crossbar passes, wherein the threading of the first section is formed on an interior surface of at least a portion of the passage of the first section and the cooperating threading of the second section is formed on at least a portion of an exterior surface of a generally cylindrical section of the second section, the second section comprise an end member comprising at least one hole therethrough attached to the generally cylindrical section, the interior passage extending through the end member, the extending section of the crossbar comprising a plurality of spaced holes therethrough, the attachment system further comprising a pin to be passed through the at least one hole of the end member and one of the plurality of spaced holes of the extending member that is aligned with the at least one hole of the end member to attach the first section to the extending section of the crossbar at one of the plurality of incremental positions.

7. A stanchion system, comprising:

a stanchion post and an attachment system for attachment to a flange comprising a first edge and a second edge, comprising:

a crossbar comprising an extending section and an abutment member on a first end thereof to abut the first edge of the flange, a base comprising a passage through which the extending section of the crossbar is linearly movable and a seating for the stanchion post, and a connector comprising a first section and a second section, the second section being attachable to the extending section of the crossbar at one of a plurality of incremental positions independent of attachment of the first section to the extending section, the first section being movable relative to the second section to adjust the position of the first section relative to the abutment member of the crossbar;

wherein the attachment system further comprises at least a first clamping surface to contact and abut a lower surface of the flange and an adjustment mechanism to adjust the force applied to the lower surface of the flange by the first clamping surface;

the first clamping surface is on a clamp member that is movable with respect to the base, the adjustment mechanism being in operative connection with the clamp member to move the clamp member upon actuation of the adjustment mechanism by a user; and the adjustment mechanism comprises an elongate threaded member that extends between the base and the clamp member and which engages the clamp member via cooperating threading on the clamp member, the elongate threaded member being a separate component from the clamp member.

8. A horizontal lifeline system, comprising:

a horizontal lifeline; and at least one stanchion system comprising:

a stanchion post; and an attachment system for attachment to a flange comprising a first edge and a second edge, comprising:
- a crossbar comprising an extending section and an abutment member on a first end thereof to abut the first edge of the flange,
- a base comprising a passage through which the extending section of the crossbar is linearly movable and a seating for the stanchion post, and
- a connector comprising a first section and a second section, the second section being attachable to the extending section of the crossbar at each of a plurality of incremental positions independent of attachment of the first section to the extending section, the first section engaged with the second section to be movable along the extending section to thereby clamp the attachment system to the flange with the second section attached at a selected one of the plurality of incremental positions.

9. An attachment system for attachment to a flange comprising a first edge and a second edge, the attachment system comprising:
- a crossbar comprising an extending section and an abutment member on a first end thereof to abut the first edge of the flange, and
- a connector comprising a first section and a second section, the second section being attachable to the extending section of the crossbar at each of a plurality of incremental positions independent of attachment of the first section to the extending section, the first section engaged with the second section to be linearly movable along the extending section in a first path in a first direction to thereby secure the attachment system to the flange with the second section attached at a selected one of the plurality of incremental positions and remaining in a fixed location along the extending section.

10. A connector for attachment to an extending section: the connector comprising a first section, a second section and an interior passage through which the extending section passes so that the connector is slidable on the extending section to each of a plurality of incremental positions, the second section being attachable to the extending section at each of the plurality of incremental positions independent of any attachment of the first section to the extending section, the first section engaged with the second section to be linearly movable along the extending section relative to the second section and the extending section with the second section attached at a selected one of the plurality of incremental positions and remaining in a fixed location along the extending section.

* * * * *